United States Patent [19]

Fujimoto

[11] Patent Number: 5,559,952

[45] Date of Patent: Sep. 24, 1996

[54] DISPLAY CONTROLLER INCORPORATING CACHE MEMORY DEDICATED FOR VRAM

[75] Inventor: Akihisa Fujimoto, Tokyo, Japan

[73] Assignee: Kabushiki Kaisha Toshiba, Kawasaki, Japan

[21] Appl. No.: 215,948

[22] Filed: Mar. 22, 1994

[30] Foreign Application Priority Data

Mar. 23, 1993 [JP] Japan .................................. 5-063985
Mar. 15, 1994 [JP] Japan .................................. 6-044449

[51] Int. Cl.⁶ ...................................................... G06F 12/00
[52] U.S. Cl. ........................ 395/164; 395/166; 345/186
[58] Field of Search ...................................... 395/162–166, 395/250, 275, 400, 425; 345/185, 186, 189, 190, 201; 364/243, 243.41, 243.44, 243.45, 246.11, 246.3

[56] References Cited

U.S. PATENT DOCUMENTS

| 5,131,080 | 7/1992 | Fredrickson | 395/164 |
| 5,276,851 | 1/1994 | Thacker et al. | 395/425 |
| 5,287,487 | 2/1994 | Priem et al. | 395/425 |
| 5,392,407 | 2/1995 | Heil | 395/325 |
| 5,426,739 | 6/1995 | Lin | 395/325 |

FOREIGN PATENT DOCUMENTS 62-249193 10/1987 Japan .
62-249194 10/1987 Japan .

OTHER PUBLICATIONS

L. Gwennap, "Intel Provides PCI Chip Set for Pentium . . . ", Microprocessor Report; V7, n4, p. 18(3), Mar. 1993.
M. Hogan, "Zeos and Gateway VL-bus PCs offer speed and Performance for Windows", PC World, V11, n1 p. 65(1), Jan. 1993.
Hayes, J. P.: "Computer Architecture and Organization", McGraw-Hill, New York, 1988 pp. 469, 470, 476, 477.

Primary Examiner—Raymond J. Bayerl
Assistant Examiner—U. Chauhan
Attorney, Agent, or Firm—Finnegan, Henderson, Farabow, Garrett & Dunner, L.L.P.

[57] ABSTRACT

A frame buffer cache is arranged to store part of image data in an image memory so that a CPU and a drawing processor can perform image data read/write operations by only accessing the frame buffer cache. Therefore, the image data read/write operations of the CPU and the drawing processor can be performed simultaneously with the access to a dual port image memory, thus improving the drawing performance of the CPU and the drawing processor.

16 Claims, 16 Drawing Sheets

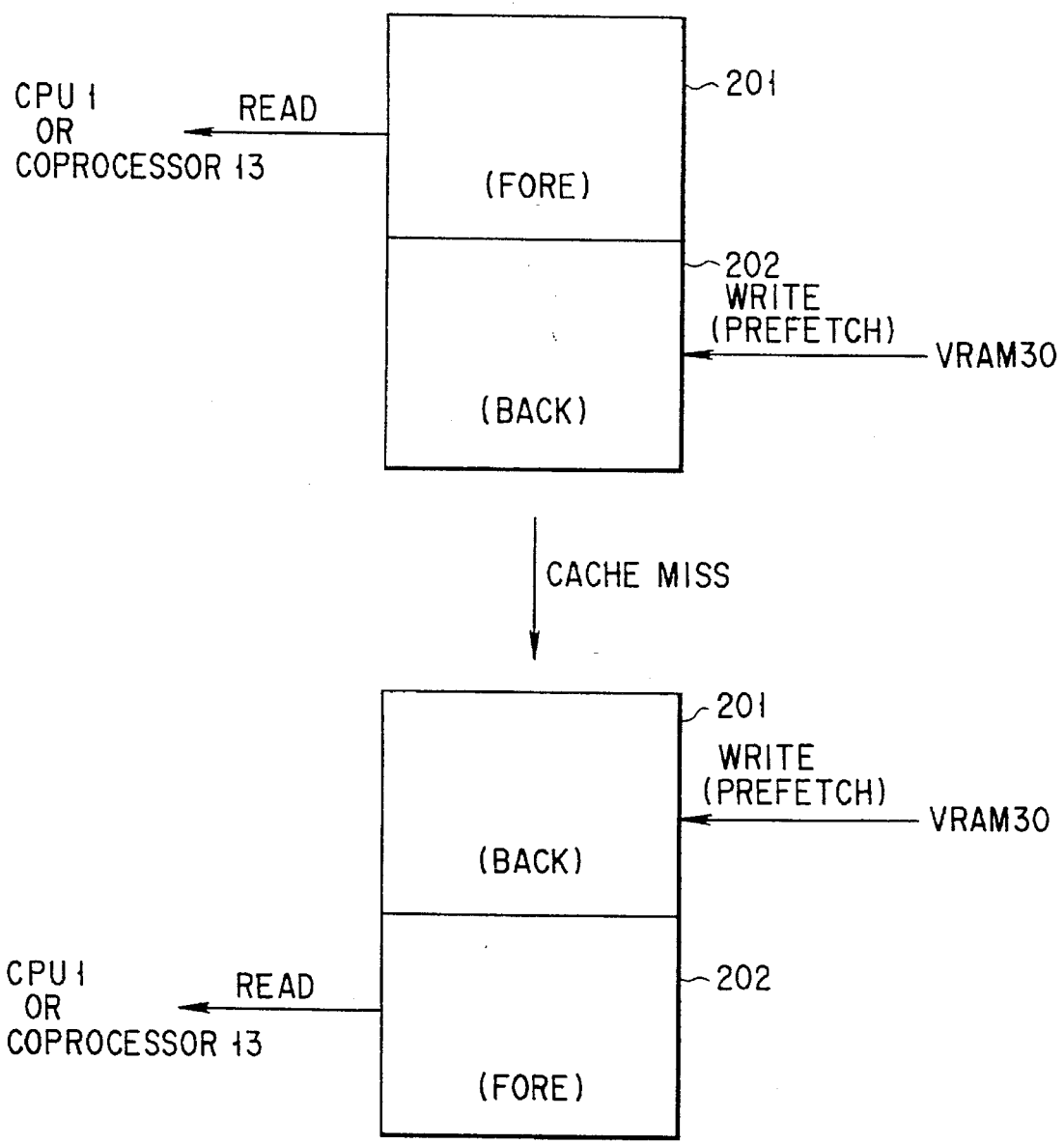
F I G. 4

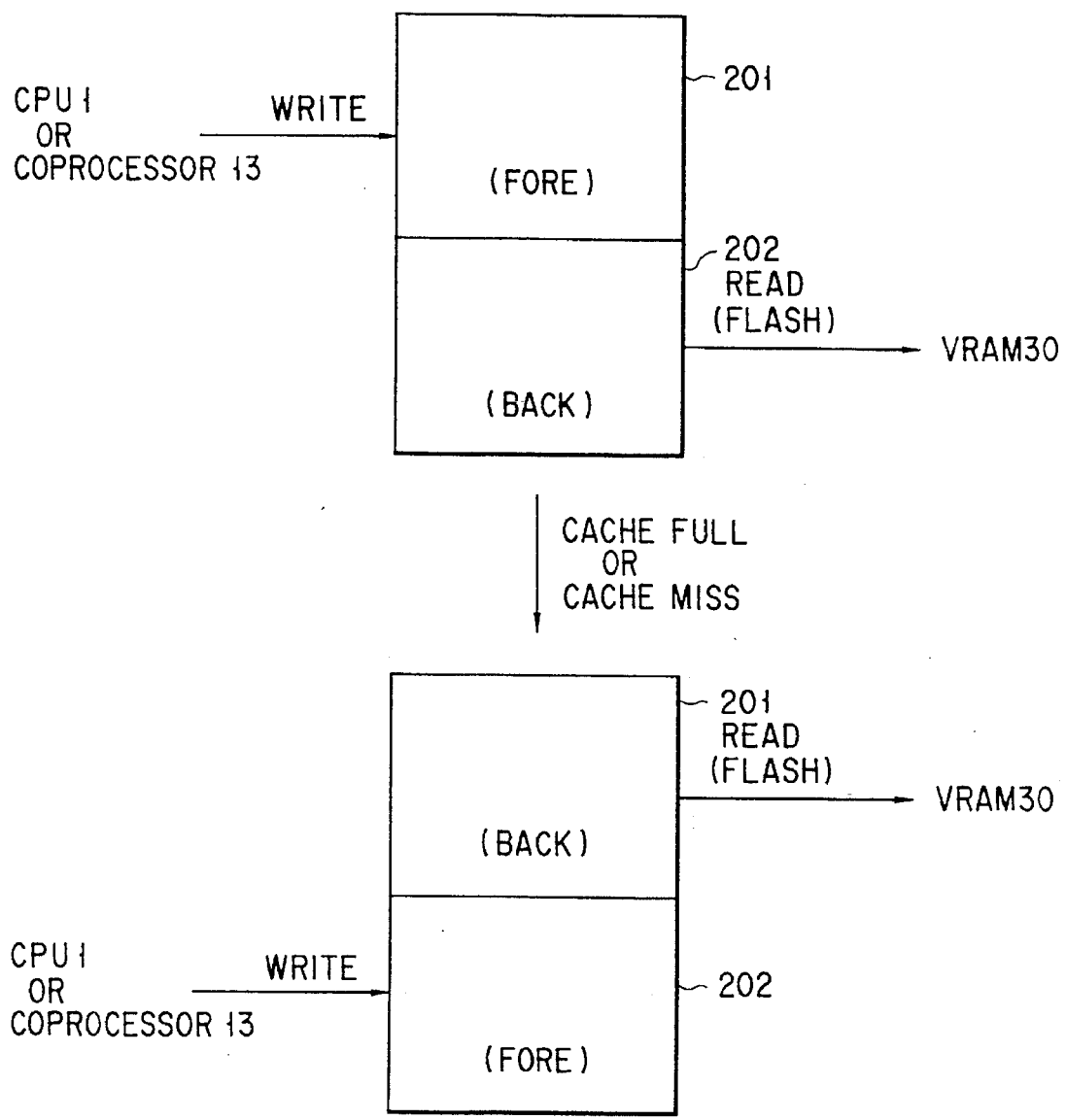
F I G. 6

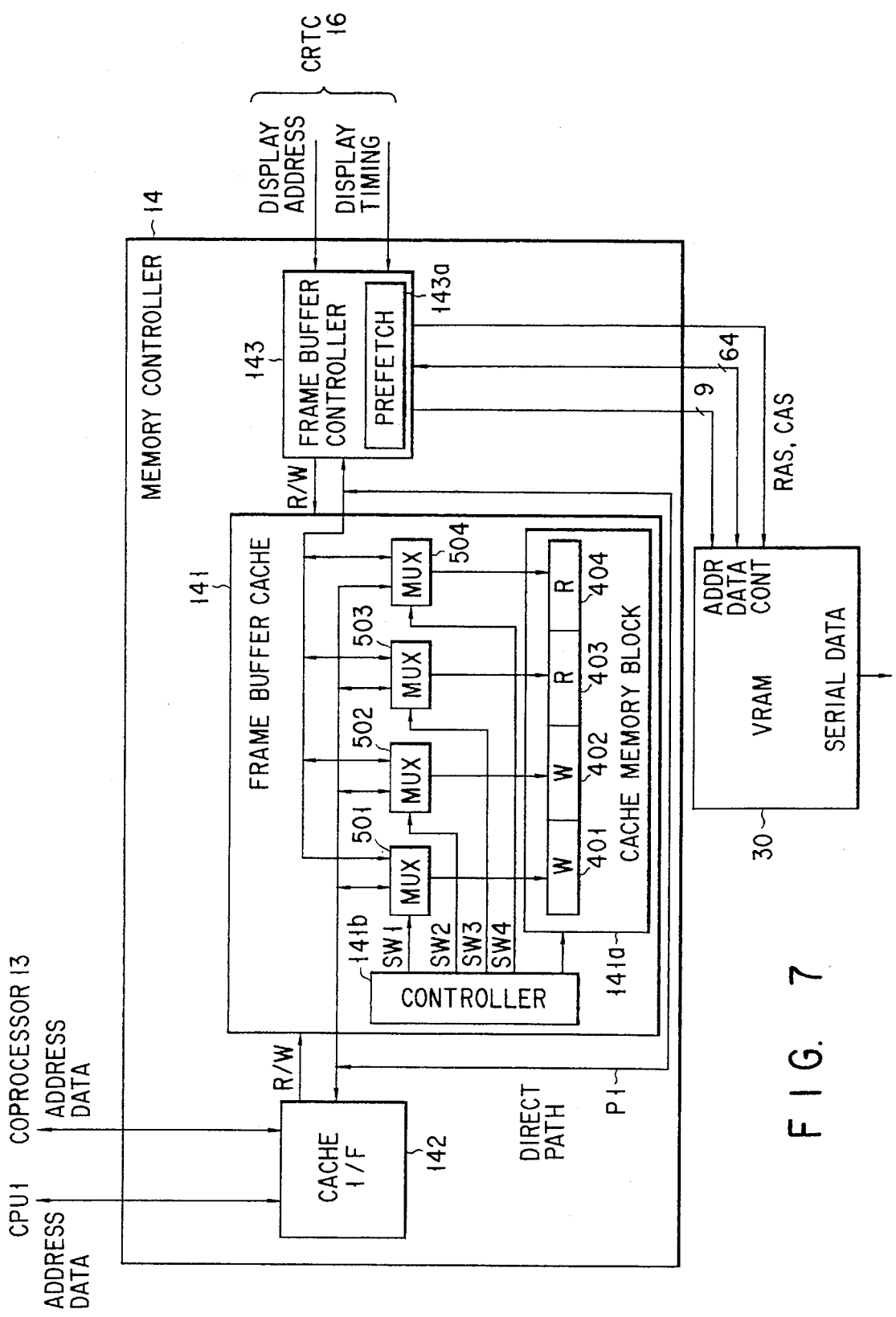
F I G. 7

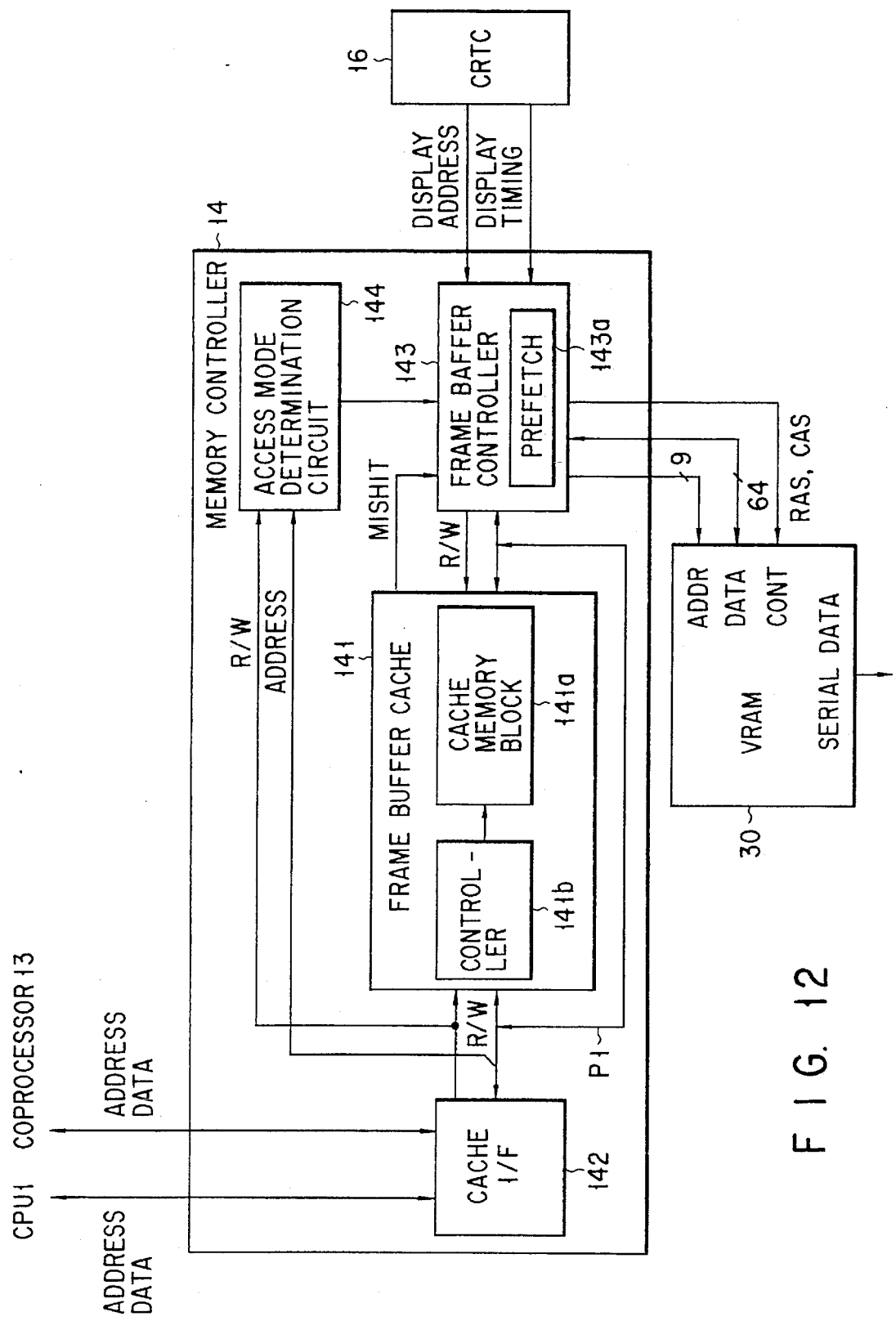
F I G. 12

| | READ ACCESS MODE | PREFETCH | VRAM ACCESS MODE |
|---|---|---|---|
| STATE 1 | RANDOM | OFF | SINGLE |
| STATE 2 | CONTINUOUS ACCESS (DEC) | ON | SINGLE |
| | | | PAGE |
| STATE 3 | CONTINUOUS ACCESS (INC) | ON | SINGLE |
| | | | PAGE |

DISPLAY CONTROLLER INCORPORATING CACHE MEMORY DEDICATED FOR VRAM

BACKGROUND OF THE INVENTION

1. Field of the Invention

The present invention relates to a display control system and, more particularly, to a display control system used for a computer such as a personal computer or a workstation.

2. Description of the Related Art

As a conventional display control system used for a computer such as a personal computer or a workstation, a system having an intermediate resolution of about 640×480 dots has been widely used. In recent years, however, with an increase in necessity to use an advanced graphical user interface, demands have arisen for a high-resolution, high-performance display control system.

In order to perform a high-resolution graphic display operation, a large-capacity image memory must be used as a frame buffer for holding image data such as character and graphic pattern data, and the contents of the image memory must be rewritten at high speed.

For this reason, in general, the memory bus width of a bus connected to the data input/output port of an image memory is set to be as large as 32 bits or 64 bits. By using such a technique, a large number of pixels are updated with one memory access.

The access speed of a host CPU or a drawing coprocessor with respect to an image memory varies depending on an instruction executed by the processor. More specifically, memory access instructions issued from the processor include a normal memory access instruction and a string move instruction (continuous data transfer instruction). The string move instruction (continuous data transfer instruction) allows a data string having continuous addresses to be read/written at high speed with one access. The access speed based on this instruction is very high.

As described above, the access speed of the processor is not constant. Therefore, when the processor is to access the image memory, synchronization must be established with respect to an access operation of image memory for every access, and the processor is kept in a wait state until the synchronization is completed. Especially in a data read operation, since read access to the image memory is started after a read request is issued from the processor, the processor is kept in a wait state without being released from access processing until the corresponding read data is confirmed. This is a main factor which causes a deterioration in the performance of the processor.

In a conventional system, when a processor is to access an image memory, synchronization must be established with respect to an access operation of the image memory for every access, and the processor is kept in a wait state until the synchronization is completed.

SUMMARY OF THE INVENTION

The present invention has been made in consideration of this situation, and has as its object to provide a display control system suitable for high-resolution graphic display, which system allows a processor to execute an image data read/write operation simultaneously with an access operation of an image memory, thereby improving the drawing performance of the processor.

According to the first aspect of the present invention, there is provided a display control system comprising: an image memory for storing image data generated by a CPU of a host computer including the display control system and a drawing processor arranged in the display control system; display means for displaying the image data, stored in the image memory, on a display; a cache memory for storing part of the image data stored in the image memory, the cache memory being designed such that the image data is read/written therefrom/therein in accordance with a read/write request from the CPU of the host computer or the drawing processor; hit detection means for detecting a cache hit/cache miss depending on whether data, read access of which is requested by the CPU of the host computer or the drawing processor, is stored in the cache memory; and memory control means, connected to the cache memory, the image memory, and the hit detection means for replacing contents of the cache memory by transferring image data stored in the image memory to the cache memory in response to a cache miss detected by the hit detection means. In this display control system, a cache memory is arranged for the image memory, and part of image data in the image memory is stored in the cache memory. The processor performs an image data read/write operation by accessing the cache memory, and the memory control means performs data transfer between the cache memory and the image memory. With this operation, drawing processing is executed/completed by the processor by only accessing the cache memory. Therefore, an image data read/write operation of the processor can be performed simultaneously with an access operation of the image memory, thus improving the drawing performance of the processor.

According to the second aspect of the present invention, the cache memory is divided into first and second cache memory blocks from/in which data can be read/written independently. The first and second cache memory blocks are alternately selected, and one cache memory block is connected to the processor, while the other cache memory block is connected to the memory control means. Therefore, the processor and the memory control means can simultaneously perform cache access, and an image data read/write operation can be performed more efficiently.

Especially, in this case, while the processor reads out image data from one of the first and second cache memory blocks, succeeding image data can be prefetched from the image memory to the other cache memory block with this technique, the processor can continuously read out image data without a wait time.

According to the third aspect of the present invention, each of write and read cache memories is divided into first and second cache memory blocks. The two read cache memory blocks are alternately selected, and one of the blocks is connected to the processor, while the other block is connected to the memory control means. Similarly, the two write cache memory blocks are alternately selected, and one of the blocks is connected to the processor, while the other block is connected to the memory control means. With this arrangement, writing of image data from the processor into the write cache and reading of image data from the write cache into the image memory can be performed at once. Furthermore, in the read mode, reading of image data from the read cache into the processor and reading of image data from the image memory to the read cache can be performed at once. Therefore, there is provided a display control system suitable for high-resolution graphic display, which system can improve the drawing performance of the CPU or the drawing coprocessor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a block diagram for explaining a read access operation of the frame buffer cache in the memory controller in FIG. 3;

FIG. 6 is a block diagram for explaining write access to the frame buffer cache in the memory controller in FIG. 3;

FIG. 7 is a block diagram showing the third arrangement of the memory controller including a frame buffer cache and arranged in the display control system in FIG. 3;

FIG. 12 is a block diagram showing the fourth arrangement of the memory controller including a frame buffer cache and arranged in the display control system in FIG. 3;

DETAILED DESCRIPTION OF THE PREFERRED EMBODIMENTS

Embodiments of the present invention will be described below with reference to the accompanying drawings.

Figure 1:
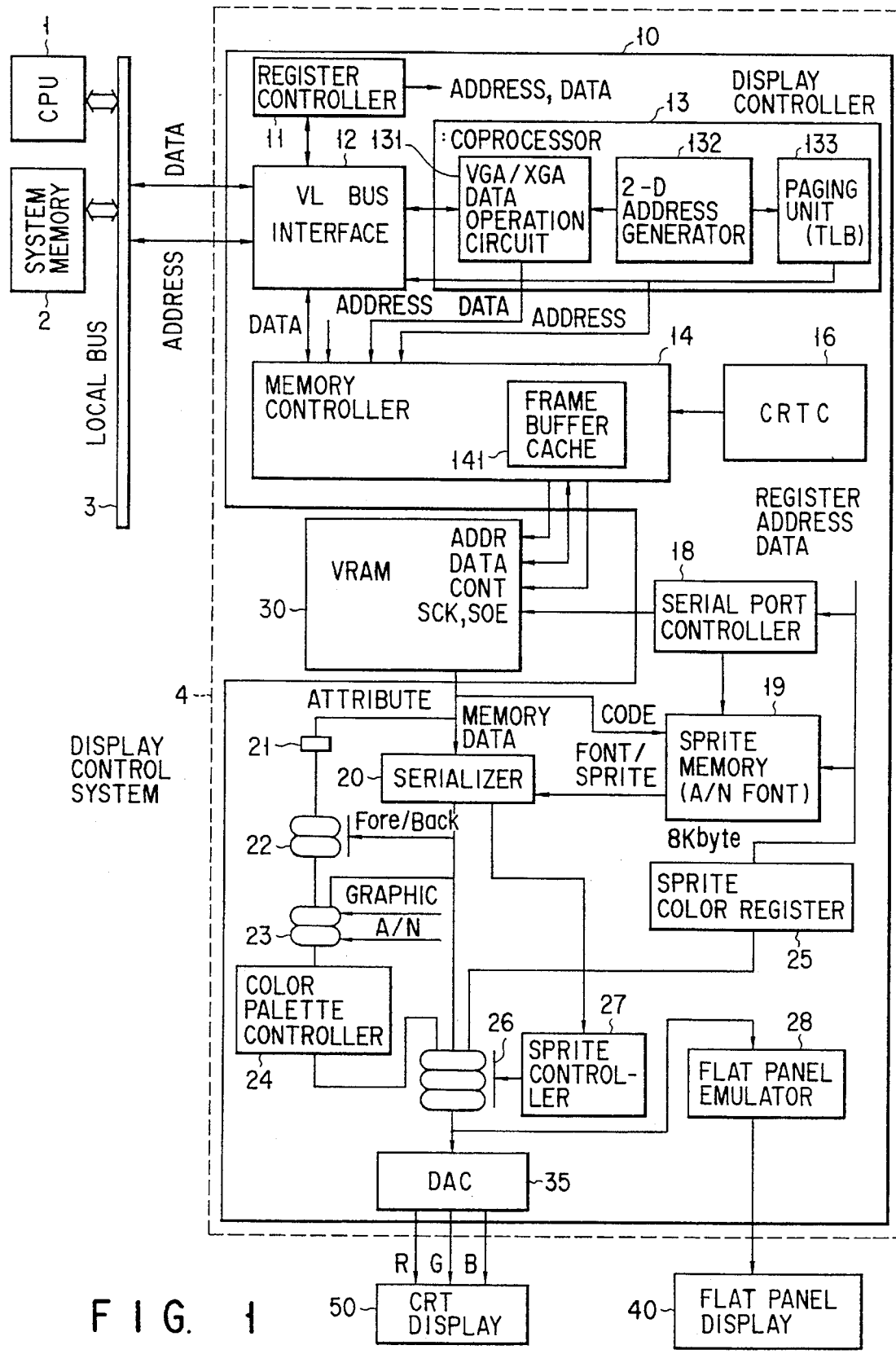
FIG. 1 is a block diagram showing the overall arrangement of a display control system according to an embodiment of the present invention.

FIG. 1 shows the overall arrangement of a display control system 4 according to an embodiment of the present invention. The display control system 4 is a display control system conforming to XGA (extended Graphics Array) specifications with, for example, a display mode of 1024×768 dots and simultaneous 256 color display. The display control system 4 is connected to a local bus 3 of a portable computer. The display control system 4 performs display control with respect to both a flat panel display 40 mounted, as a standard unit, on the portable computer body and a color CRT display 50 connected thereto as an option.

A display controller 10 and a dual port image memory (VRAM) 30 are arranged in the display control system 4. The display controller 10 and the dual port image memory (VRAM) 30 are mounted on a circuit board (not shown).

The display controller 10 is an LSI realized by a gate array and constitutes a main portion of the display control system 4. The display controller 10 executes display control with respect to the flat panel display 40 and the color CRT display 50 by using the dual port image memory (VRAM) 30. The display controller 10 serves as a bus master and can directly access a memory 2 of the computer.

The dual port image memory (VRAM) 30 includes a serial port (serial DATA) used for serial access, and a parallel port (DATA) used for random access. The serial port (serial DATA) is used to perform a data read operation to refresh the display screen. The parallel port (DATA) is used to update image data. The dual port image memory (VRAM) 30 is constituted by a plurality of dual port DRAMs and has a storage capacity of 1 Mb through 4 Mb. The dual port image memory (VRAM) 30 is used as a frame buffer, in which image data to be displayed on the flat panel display 40 or the color CRT display 50 is drawn.

In this case, XGA drawing data generated by an application program or the like conforming to the XGA specifications is stored in the dual port image memory (VRAM) 30 by a packed pixel scheme. The packed pixel scheme is a color information mapping scheme in which one pixel is expressed by a plurality of continuous bits in a memory. For example, one pixel is expressed by 1, 2, 4, 8 or 16 bits. On the other hand, VGA drawing data generated by the application program or the like conforming to the VGA specifications is stored in the dual port image memory (VRAM) 30 by a memory plane scheme. The memory plane scheme is a scheme in which a memory area is divided into a plurality of planes designated by the same address, and color information of each pixel is allocated to these planes. If, for example, four planes are prepared, one pixel is expressed by one bit for each plane, i.e., data consisting of a total of four bits.

In addition, text data is stored in the dual port image memory (VRAM) 30. Text data corresponding to one character consists of an 8-bit code and an 8-bit attribute, i.e., has a size of a total of two bytes, in either the XGA specification or the VGA specifications. The attribute is constituted by 4-bit data for designating the color of a foreground and 4-bit data for designating the color of a background.

The display controller 10 is constituted by a register controller 11, a VL bus interface 12, a coprocessor 13 for drawing, a memory controller 14, a CRT controller (CRTC) 16, a serial port controller 18, a sprite memory 19, a serializer 20, a latch circuit 21, a foreground/background multiplexer (Fore/Back) 22, a graphic/text multiplexer 23, a color palette controller 24, a sprite color register 25, a CRT video multiplexer 26, a sprite controller 27, a flat panel emulator 28, and a DAC (D/A converter) 35.

The register controller 11 receives addresses and data from the local bus 3 via the VL bus interface 12, decodes the addresses, and performs read/write control with respect to various registers designated by the decoding results. The VL bus interface 12 performs interface control with respect to the host CPU 1 via the local bus 3.

The coprocessor 13 is a graphic accelerator, which provides various drawing functions for drawing data in the dual port image memory (VRAM) 30 in accordance with instructions from the CPU 1. The coprocessor 13 has a pixel block transfer function such as a BITBLT function, a line drawing function, an area filling function, an inter-pixel logic/arithmetic calculating function, a screen cut function, a map mask function, an addressing function with an X-Y coordinate system, a memory managing function based on paging, and the like. The coprocessor 13 includes a VGA/XGA compatible data operation circuit 131, a 2-D address generator 132, and a paging unit 133.

The data operation circuit 131 serves to perform data operations such as a shift operation, logic/arithmetic calculation, a bit mask operation, and color comparison. The data operation circuit 131 also has a VGA compatible BITBLT function. The 2-D address generator 132 generates an X-Y 2-D address for rectangular area access. In addition, the 2-D address generator 132 performs conversion processing to obtain a linear address (actual memory address) by using an area check, segmentation, and the like. The paging unit 133 serves to support the same virtual storage mechanism as the CPU 1. In a valid paging period, the paging unit 133 converts a linear address, generated by the 2-D address generator 132, into an actual address by paging. In an invalid paging period, a linear address is used as an actual address without any modification. The paging unit 133 has a TLB for paging.

The memory controller 14 performs access control with respect to the dual port image memory (VRAM) 30. More specifically, the memory controller 14 performs access control with respect to the parallel port of the dual port image memory (VRAM) 30 in accordance with a read/write request from the CPU 1 or the coprocessor 13, and also performs data read control with respect to the serial port of the dual port image memory (VRAM) 30 in accordance with a display position address from the CRTC 16.

A frame buffer cache 141 is incorporated in the memory controller 14. The frame buffer cache 141 is used to allow the CPU 1 or the coprocessor 13 to read/write image data at high speed. The frame buffer cache 141 holds part of image data stored in the dual port image memory (VRAM) 30. When image data requested for read access is generated by the CPU 1 or the coprocessor 13 is present in the frame buffer cache 141, the image data is read out from the frame buffer cache 141 and transferred to the CPU 1 or the coprocessor 13. In this case, no read access is performed via the parallel port of the dual port image memory (VRAM) 30.

Image data access control using this frame buffer cache 141 is a characteristic feature of the present invention. This control operation will be described in detail with reference to FIG. 2 and the subsequent drawings.

The CRT controller (CRTC) 16 generates various display timing signals (e.g., horizontal and vertical sync signals) for causing the flat panel display 40 or the color CRT display 50 to perform a screen display operation with a high resolution (e.g., 1024×768 dots) conforming to the XGA specifications, and various timing signals (e.g., horizontal and vertical sync signals) for causing the flat panel display 40 or the color CRT display 50 to perform a screen display operation with an intermediate resolution (e.g., 640×460 dots) conforming to the VGA specifications. In addition, the CRT controller (CRTC) 16 generates a display address for reading out image data to be displayed on the screen from the serial port (serial DATA) of the dual port image memory (VRAM) 30, and supplies the address to the memory controller 14.

The serial port controller 18, the sprite memory 19, the serializer 20, the latch circuit 21, the foreground/background multiplexer 22, the graphic/text multiplexer 23, the color palette controller 24, the sprite color register 25, the CRT video multiplexer 26, the sprite controller 27, the flat panel emulator 28, and the DAC (D/A converter) 35 constitute a display circuit for displaying image data, stored in the dual port image memory (VRAM) 30, on the flat panel display 40 or the color CRT display 50.

The serial port controller 18 generates a clock SCK and an output enable signal SOE which are used to control the timing at which data is read out from the serial port of the dual port image memory (VRAM) 30. In addition, the serial port controller 18 performs access control with respect to the sprite memory 19 and display timing control of a sprite.

Sprite data is written in the sprite memory 19 in the graphic mode; and font data, in the text mode. In the text mode, the code of text data read out from the dual port image memory (VRAM) 30 is supplied, as an index, to the sprite memory 19, and font data corresponding to the code is read out.

The serializer 20 is a parallel/serial converter for converting parallel pixel data corresponding to a plurality of pixels into pixel units (serial data). In the graphic mode, the serializer 20 performs parallel/serial conversion of memory data read out from the serial port of the dual port image memory (VRAM) 30 and sprite data read out from the sprite memory 19. In the text mode, the serializer 20 performs parallel/serial conversion of font data read out from the sprite memory 19.

The latch circuit 21 serves to delay the attribute output timing by a delay time caused when code data is converted into font data. In the text mode, the latch circuit 21 holds the attributes of text data read out from the dual port image memory (VRAM) 30. The foreground/background multiplexer 22 selects either a foreground color or a background color as an attribute in the text mode. This selection is controlled by the value of font data, i.e., "1" (foreground) or "0" (background), output from the serializer 20. The graphic/text multiplexer 23 serves to switch the graphic and text modes. In the graphic mode, the graphic/text multiplexer 23 selects memory data output from the serializer 20. In the text mode, the graphic/text multiplexer 23 selects an output from the foreground/background multiplexer 22.

The color palette controller 24 performs color conversion of graphic or text data. The color palette controller 24 has a two-stage color palette table. The first color palette table is constituted by 16 color palette registers. In each color palette register, 6-bit color palette data is stored. The second color palette table is constituted by 256 color palette registers. In each color palette register, 18-bit color data consisting of 6-bit R, G, and B data is stored.

In the graphic mode, 8-bit/pixel XGA memory data is directly supplied to the second color palette table without the mediacy of the first color palette table. In the second color palette table, the data is converted into color data consisting of 6-bit R, G, and B data. Four-bit/pixel VGA memory data is sent first to the first color palette table. The data is then converted into 6-bit color data and output. Two-bit data output from the color selection register incorporated in the sprite memory 19 is added to this 6-bit color data, thus forming color data consisting of a total of eight bits. Thereafter, this 8-bit color data is sent to the second color palette table to be converted into color data consisting of 6-bit R, G, and B data.

In the text mode, both XGA and VGA text data are converted into color data, each consisting of 6-bit R, G, and B data, through the first and second color palette tables.

The XGA graphic mode includes a direct color mode in which one pixel is constituted by 16 bits. In this mode, 16-bit/pixel memory data is directly supplied to the CRT video multiplexer 26 without the mediacy of the color palette controller 24.

The sprite color register 25 designates a sprite display color. The CRT video multiplexer 26 serves to select a CRT video display output. The CRT video multiplexer 26 selects an output from the color palette controller 24 or a direct color output from the serializer 20 and also performs video switching of a sprite display. The sprite controller 27iplexers the CRT video multiplexer 26 in accordance with sprite data parallel/serial-converted by the serializer 20, and performs video switching control in a sprite display operation. The flat panel emulator 28 converts CRT video output to generate flat video data for the flat panel display 40.

The DAC 35 converts CRT video data output from the CRT video multiplexer 26 into analog R, G, and B signals, and supplies the signals to the color CRT display 50.

A drawing operation using the frame buffer cache 141 as a characteristic feature of the present invention will be described below.

Figure 2:
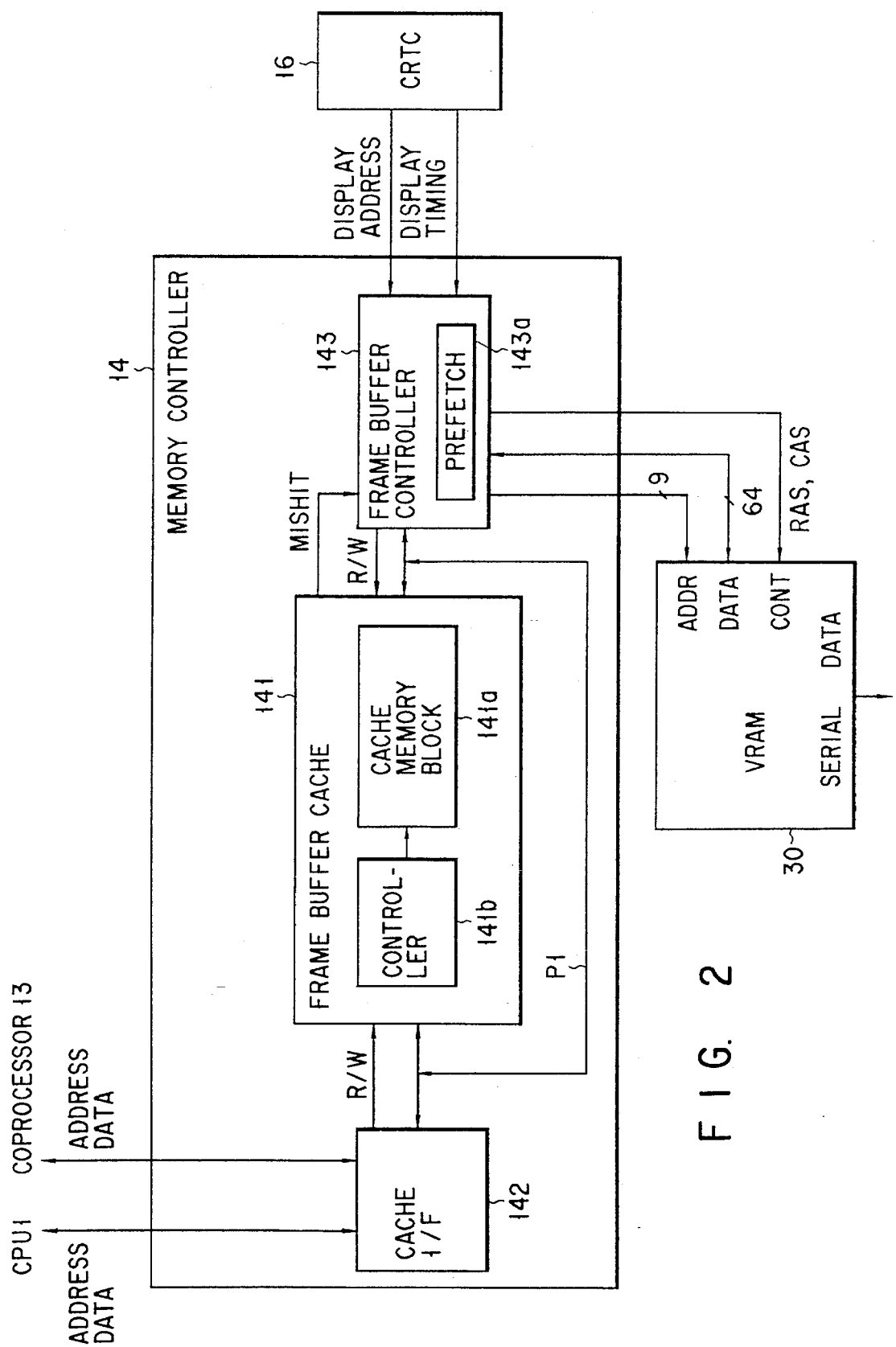
FIG. 2 is a block diagram showing the first arrangement of a memory controller including a frame buffer cache and arranged in the display control system in FIG. 1.

FIG. 2 shows the detailed arrangement of the memory controller 14 incorporating the frame buffer cache 141.

As shown in FIG. 2, the memory controller 14 comprises the frame buffer cache 141, a cache interface 142, and a frame buffer controller 143.

The cache interface 142 serves as an interface between the CPU 1, the drawing coprocessor 13, and the frame buffer cache 141. Upon reception of an access request with respect to image data from the CPU 1 or the drawing coprocessor 13, the cache interface 142 supplies an address and data included in the access request to the frame buffer cache 141, and also supplies them to the frame buffer controller 143 via a direct path P1. At this time, the cache interface 142 generates a read/write signal (R/W) indicating whether the access request is read or write access, and supplies it to the frame buffer cache 141.

The frame buffer controller 143 performs access control with respect to the frame buffer cache 141 and the dual port image memory (VRAM) 30 to transfer image data between the frame buffer cache 141 and the dual port image memory (VRAM) 30. When the frame buffer cache 141 is to be accessed, the frame buffer controller 143 sets the frame buffer cache 141 in the write or read mode by using a read/write signal (R/W).

Transfer of image data between the frame buffer cache 141 and the dual port image memory (VRAM) 30 is performed to replace the image data in the frame buffer cache 141 or update the image data in the dual port image memory (VRAM) 30.

If, for example, a cache miss occurs in read access to the frame buffer cache 141 which is executed by the CPU 1 or the drawing coprocessor 13, the frame buffer controller 143 reads out the image data requested for the read access, from the dual port image memory (VRAM) 30, and writes the data in the frame buffer cache 141. With this operation, the image data in the frame buffer cache 141 is replaced. Such replace processing of the image data in the frame buffer cache 141 is started in response to a mishit signal supplied from the frame buffer cache 141.

The frame buffer controller 143 periodically writes image data, written in the frame buffer cache 141 by the CPU 1 or the drawing coprocessor 13, in the dual port image memory (VRAM) 30 to update the image data in the dual port image memory (VRAM) 30.

This update processing is performed to cause the image data in the dual port image memory (VRAM) 30 to reflect the contents of image data drawn in the frame buffer cache 141, and is executed for each frame period, in which the display screen is refreshed, in accordance with a display timing signal (e.g., a vertical sync signal) from the CRTC 16.

The frame buffer controller 143 includes a prefetch circuit (PREFETCH) 143a for prefetching image data to a cache memory block 141a. The prefetch circuit 143a serves to store image data expected for read access to be made by the CPU 1 or the drawing coprocessor 13, in the cache memory block 141a in advance.

The frame buffer cache 141 is designed to execute an image data read/write operation in accordance with a read/write request supplied from the CPU 1 or the drawing coprocessor 13 or a read/write request from the frame buffer controller 143. That is, the frame buffer cache 141 is constituted by the cache memory block 141a for holding image data and a controller 141b for performing read/write control and the like with respect to the cache memory block 141a.

An image data read/write operation using the frame buffer cache 141 is performed in the following manner.

A case wherein the CPU 1 or the drawing coprocessor 13 reads out image data from the dual port image memory (VRAM) 30 will be described first.

Part of the image data in the dual port image memory (VRAM) 30 is stored in the cache memory block 141a by the prefetch circuit 143a in advance.

When a read request is issued from, for example, the CPU 1 to the dual port image memory (VRAM) 30 in this state, the read request is sent to the cache interface 142 of the memory controller 14 via the VL bus interface 12 in FIG. 1. The cache interface 142 supplies a read address from the CPU 1 to the frame buffer cache 141, and also sets the frame buffer cache 141 in the read mode by using a read/write signal (R/W).

If image data designated by the read address is present in the cache memory block 141a (cache hit), the image data is read out from the frame buffer cache 141 and transferred to the CPU 1 via the cache interface 142 and the VLBUS interface 12 in FIG. 1.

If the image data designated by the read address is not present in the frame buffer cache 141 (cache miss), a mishit signal is supplied from the frame buffer cache 141 to the frame buffer controller 143.

In response to this mishit signal, the frame buffer controller 143 reads out a data block including the image data designated by the read address, received from the cache interface 142, from the dual port image memory (VRAM) 30. The frame buffer controller 143 then writes the data block in the frame buffer cache 141 and transfers it to the cache interface 142.

A case wherein image data is written in the dual port image memory (VRAM) 30 by the CPU 1 or the drawing coprocessor 13 will be described next.

When a write request for image data is issued from, for example, the CPU 1, the write request is sent to the cache interface 142 of the memory controller 14 via the VL bus interface 12 in FIG. 1. The cache interface 142 supplies the write address and the write data from the CPU 1 to the frame buffer cache 141, and also sets the frame buffer cache 141 in the write mode by using a read/write signal (R/W). The write data supplied from the CPU 1 is sequentially written in the cache memory block 141a.

The data written in the cache memory block 141a is periodically transferred to the dual port image memory (VRAM) 30 to be written therein in synchronism with a display timing signal from the frame buffer controller 143.

As described above, the memory controller 14 includes the frame buffer cache 141, and part of the image data in the image memory 30 is stored in the cache memory block 141a of the frame buffer cache 141. The CPU 1 or the drawing coprocessor 13 accesses the frame buffer cache 141 to read and write image data. The frame buffer controller 143 performs data transfer between the frame buffer cache 141 and the dual port image memory 30 with this operation, the CPU 1 or the drawing coprocessor 13 can perform drawing processing by only accessing the frame buffer cache 141 independently of an access operation of the dual port image memory 30. Therefore, the CPU 1 or the drawing coprocessor 13 can perform an image data read/write operation simultaneously with an access operation of the dual port image memory 30, thereby preventing the CPU 1 or the coprocessor 13 from being set in a wait state until memory access to the dual port image memory 30 is completed.

Figure 3:
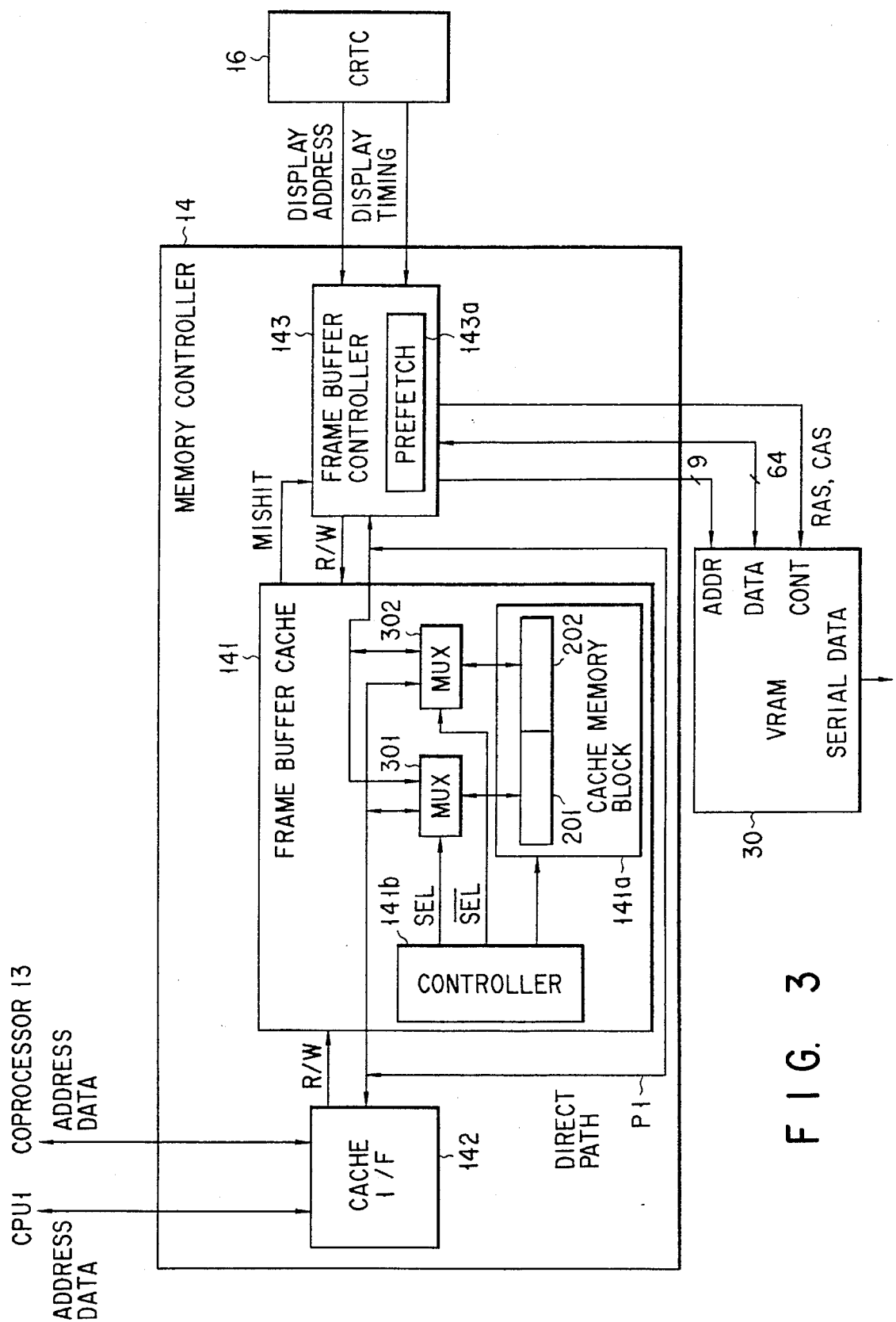
FIG. 3 is a block diagram showing the second arrangement of the memory controller including a frame buffer cache and arranged in the display control system in FIG. 1.

FIG. 3 shows the second arrangement of the memory controller 14.

In the memory controller 14 shown in FIG. 3, the cache memory block 141a is divided into two cache memory blocks 201 and 202 to allow the CPU 1 or the coprocessor 13 and the memory controller 14 to execute cache access at once. These cache memory blocks 201 and 202 are designed to independently perform data read/write operations.

The cache memory block 201 is selectively connected to the cache interface 142 or the frame buffer controller 143 via a multiplexer 301. Similarly, the cache memory block 202 is selectively connected to the cache interface 142 or the frame buffer controller 143 via a multiplexer 302.

The multiplexers 301 and 302 serve to alternately switch/connect the cache memory blocks 201 and 202 to the cache interface 142 and the frame buffer controller 143. These select operations are complementarily controlled by selection signals SEL and $\overline{\text{SEL}}$. Therefore, when one of the cache memory blocks 201 and 202 is connected to the cache interface 142, the other cache memory block is connected to the frame buffer controller 143.

A cache read operation in the memory controller 14 shown in FIG. 3 will be described next with reference to FIG. 4.

Assume that the cache memory block 201 is connected to the cache interface 142, and the cache memory block 202 is connected to the frame buffer controller 143. In this case, the cache memory block 201 serves as a foreground cache (FORE) to be accessed by the CPU 1 or the coprocessor 13, whereas the cache memory block 202 serves a background cache (BACK) to be accessed by the frame buffer controller 143.

When the CPU 1 or the coprocessor 13 is to read image data, a read address from the CPU 1 or the coprocessor 13 is sent to the cache memory block 201 as the foreground cache, thus read-accessing the cache memory block 201. Concurrently with this read access to the cache memory block 201, image data is prefetched from the dual port image memory (VRAM) 30 to the cache memory block 201 by the prefetch circuit 143a. The prefetched image data is an image data block succeeding the image data stored in the cache memory block 201.

In this prefetch operation, the dual port image memory (VRAM) 30 is read-accessed in the page mode, in which a plurality of image data continuously arranged in the order of addresses are continuously read out at high speed. In this case, the page mode is a high-speed memory access mode in which only the column address is sequentially incremented while the row address is kept unchanged.

If a cache miss occurs in read access to the cache memory block 201, the foreground cache and the background cache are switched from each other by the multiplexers 301 and 302. With this operation, the cache memory block 202 serves as the foreground cache, and the cache memory block 201 serves as the background cache.

Since the succeeding image data has already been prefetched to the cache memory block 202, the CPU 1 or the coprocessor 13 can sequentially read the image data without a wait time when read access with continuous addresses is made.

Figure 5:
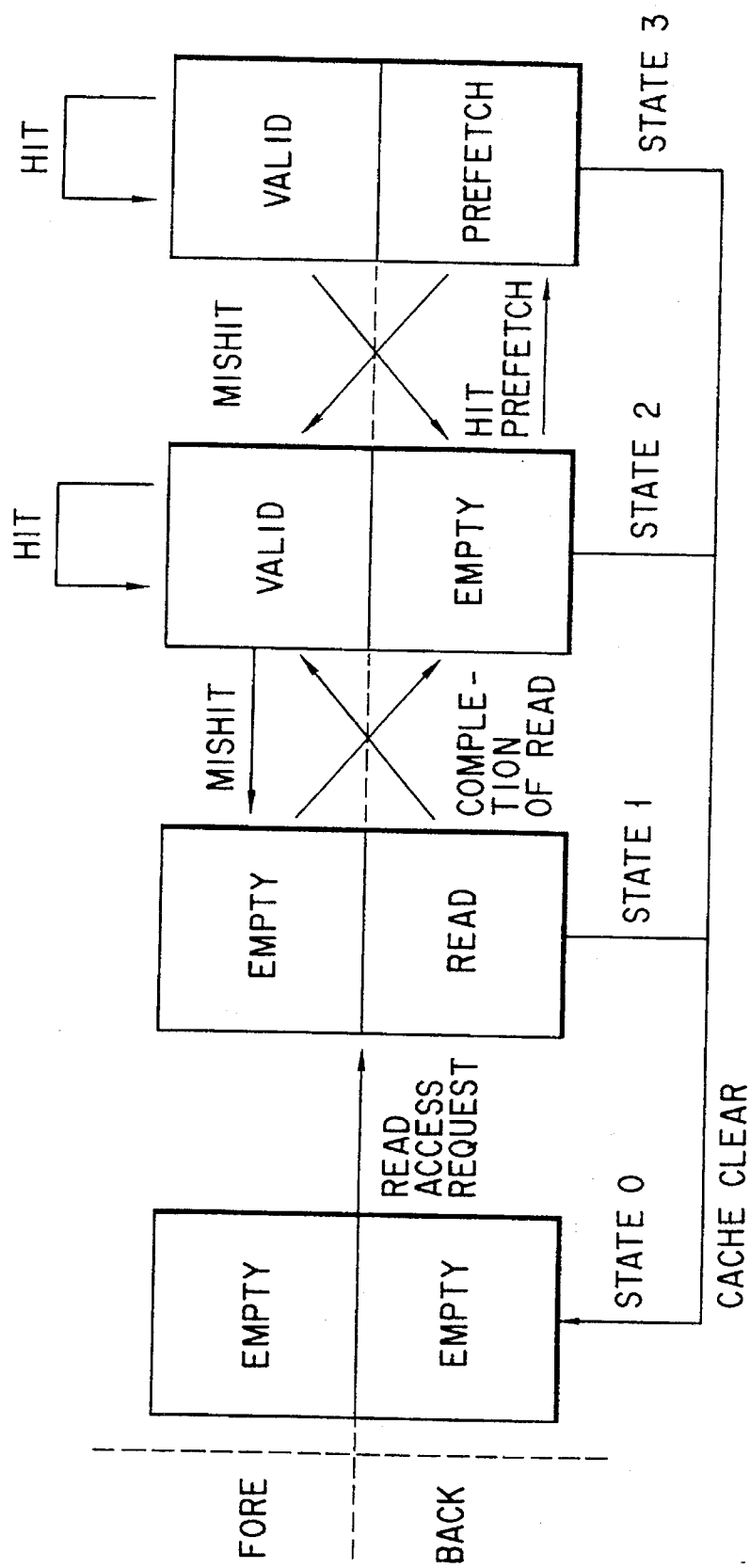
FIG. 5 is a block diagram for explaining a foreground/background switching operation of the frame buffer cache in the memory controller in FIG. 3.

FIG. 5 shows the state transition of the cache memory blocks 201 and 202 in such a cache read operation.

Referring to FIG. 5, state 0 indicates an initial state in which valid data are stored in neither the foreground cache nor the background cache. When a read request for image data is issued from the CPU 1 or the coprocessor 13 in this state, transition from state 0 to state 1 occurs.

In state 1, the frame buffer controller 143 read-accesses the dual port image memory 30 in the page mode to read out image data therefrom, and writes the data in the background cache. With this operation, an image data block in which the image data requested for read access is located at the start position is stored in the background cache. When a data read operation with respect to the dual port image memory 30 is completed, a foreground cache/background cache switching operation is performed. As a result, transition from state 1 to state 2 occurs.

In state 2, valid data is present in the foreground cache. The CPU 1 or the coprocessor 13 read-accesses the foreground cache.

If a cache miss occurs in this read access, transition to state 1 occurs. In this transition, a foreground cache/background cache switching operation is not performed.

If a cache hit occurs in state 2, state 2 is maintained. In this case, if a prefetch operation is to be performed by the prefetch circuit 143a, transition to state 3 occurs.

In state 3, the CPU 1 or the coprocessor 13 performs read access to the foreground cache, and the prefetch circuit 143a simultaneously prefetches image data to the background cache.

If a cache miss occurs in read access to the foreground cache in state 3, a foreground cache/background cache switching operation is performed to set the state to state 2. If a cache hit occurs in state 3, state 3 is maintained.

A cache write operation performed by the memory controller 14 in FIG. 3 will be described next with reference to FIG. 6.

Assume that the cache memory block 201 is connected to the cache interface 142, and the cache memory block 202 is connected to the frame buffer controller 143. In this case, the cache memory block 201 serves as a foreground cache (FORE) to be write-accessed by the CPU 1 or the coprocessor 13, whereas the cache memory block 202 serves as a background cache (BACK) to be write-accessed by the frame buffer controller 143.

When the CPU 1 or the coprocessor 13 is to write image data, a write address and write data from the CPU 1 or the coprocessor 13 are sent to the cache memory block 201 as the foreground cache, thus gaining write access to the cache memory block 201. Concurrently with this write access to the cache memory block 201, the cache memory block 202 as the background cache is read-accessed to update the contents of the dual port image memory (VRAM) 30, and the contents of the cache memory block 202 are written in the dual port image memory (VRAM) 30 (cache flash).

When data are written at all the entries of the cache memory block 201 (cache full), the foreground cache and the background cache are switched from each other by the multiplexers 301 and 302. With this operation, the cache memory block 202 serves as the foreground cache, and the cache memory block 201 serves as the background cache.

This foreground cache/background cache switching operation is performed not only when "cache full" occurs but also when the value of an address exceeds an address range in which data can be written in the page mode (cache miss).

This operation is performed to execute a cache flash operation by write-accessing the dual port image memory (VRAM) 30 in the page mode.

In order to write-access the dual port image memory (VRAM) 30 in the page mode, all the image data written in the cache memory block have the same row address. If, therefore, image data to be written has a row address different from that of image data already written in one cache memory block, a foreground cache/background cache switching operation is performed to write the image data in the other cache memory block.

When a foreground cache/background cache switching operation is performed, the cache memory block 202 serves as the foreground cache, and the cache memory block 201 serves as the background cache. Subsequently, therefore, the CPU 1 or the coprocessor 13 write-accesses the cache memory block 202, and the frame buffer controller 143 read-accesses the cache memory block 201 to perform a cache flash operation.

As described above, in the arrangement shown in FIG. 3, since the two cache memory blocks 201 and 202 can be independently access-controlled, the CPU 1 or the coprocessor 13 and the frame buffer controller 143 can simultaneously perform cache access without considering their operation timings. Even if, therefore, the cache access speed of the CPU 1 or the coprocessor 13 is different from the access speed of the frame buffer controller 143 with respect to the dual port image memory 30, the CPU 1 or the coprocessor 13 can perform a cache read/write operation at its own timing. The frame buffer controller 143 can also perform a cache read/write operation independently of the CPU 1 or the coprocessor 13 in accordance with only the access timing of the dual port image memory 30.

Furthermore, in the arrangement shown in FIG. 3, a cache read operation and a cache write operation can be simultaneously performed. For example, in an image data write operation, an image data cache write (write) operation and a cache flash operation (read) can be performed at once by setting the foreground and background caches in the write and read modes, respectively. Similarly, in an image data read operation, reading of image data from a cache (read) and an image data prefetch operation (write) can be performed at once by setting the foreground and background caches in the read and write modes, respectively.

The third arrangement of the memory controller 14 will be described next with reference to FIG. 7.

This memory controller 14 is designed to increase the speed of drawing processing which includes both read access and write access to the dual port image memory 30, as in the case of line drawing. For this purpose, the memory controller 14 has a write cache and a read cache separately.

More specifically, in the memory controller 14, the cache memory block 141a is divided into four cache memory blocks 401 through 404 from/in which data can be read/written independently.

Of these cache memory blocks, the cache memory blocks 401 and 402 are used as write caches (W), and the cache memory blocks 403 and 404 are used as read caches (R).

Each write cache (W) serves as a dedicated cache designed to store write data from the CPU 1 or the coprocessor 13. The write caches are used to increase the speed of an image write operation performed by the CPU 1 or the coprocessor 13.

Each read cache (R) serves as a dedicated cache designed to store image data read out from the dual port image memory 30. The read caches are used to increase the speed of an image data read operation performed by the CPU 1 or the coprocessor 13.

The cache memory block 401 is selectively connected to the cache interface 142 or the frame buffer controller 143 via a multiplexer 501. Similarly, the cache memory block 402 is selectively connected to the cache interface 142 or the frame buffer controller 143 via a multiplexer 502.

In this case, the select operations of the multiplexers 501 and 502 are complementarily performed by selection signals SEL1 and SEL2, and the write cache memory blocks 401 and 402 are alternately switched to a foreground cache and a background cache.

The read cache memory block 403 and 404 are also selectively connected to the cache interface 142 or the frame buffer controller 143 via corresponding multiplexers 503 and 504.

The select operations of the multiplexers 503 and 504 are complementarily performed by selection signals SEL 3 and SEL 4, and the read cache memory blocks 403 and 404 are alternately switched to a foreground cache and a background cache.

Figure 8:
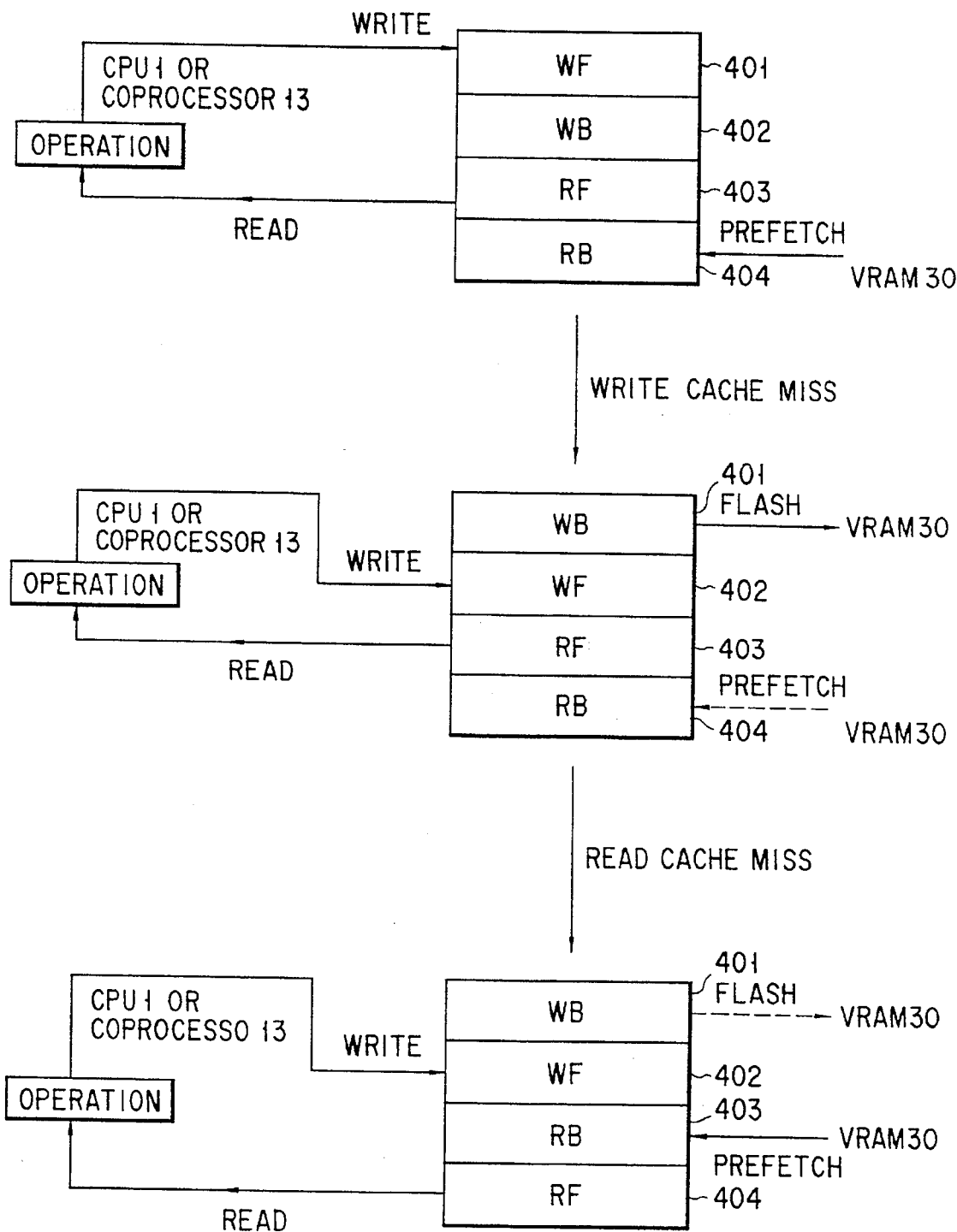
FIG. 8 is a block diagram for explaining a cache access operation in a mixed access mode in the memory controller in FIG. 7.
Figure 9:
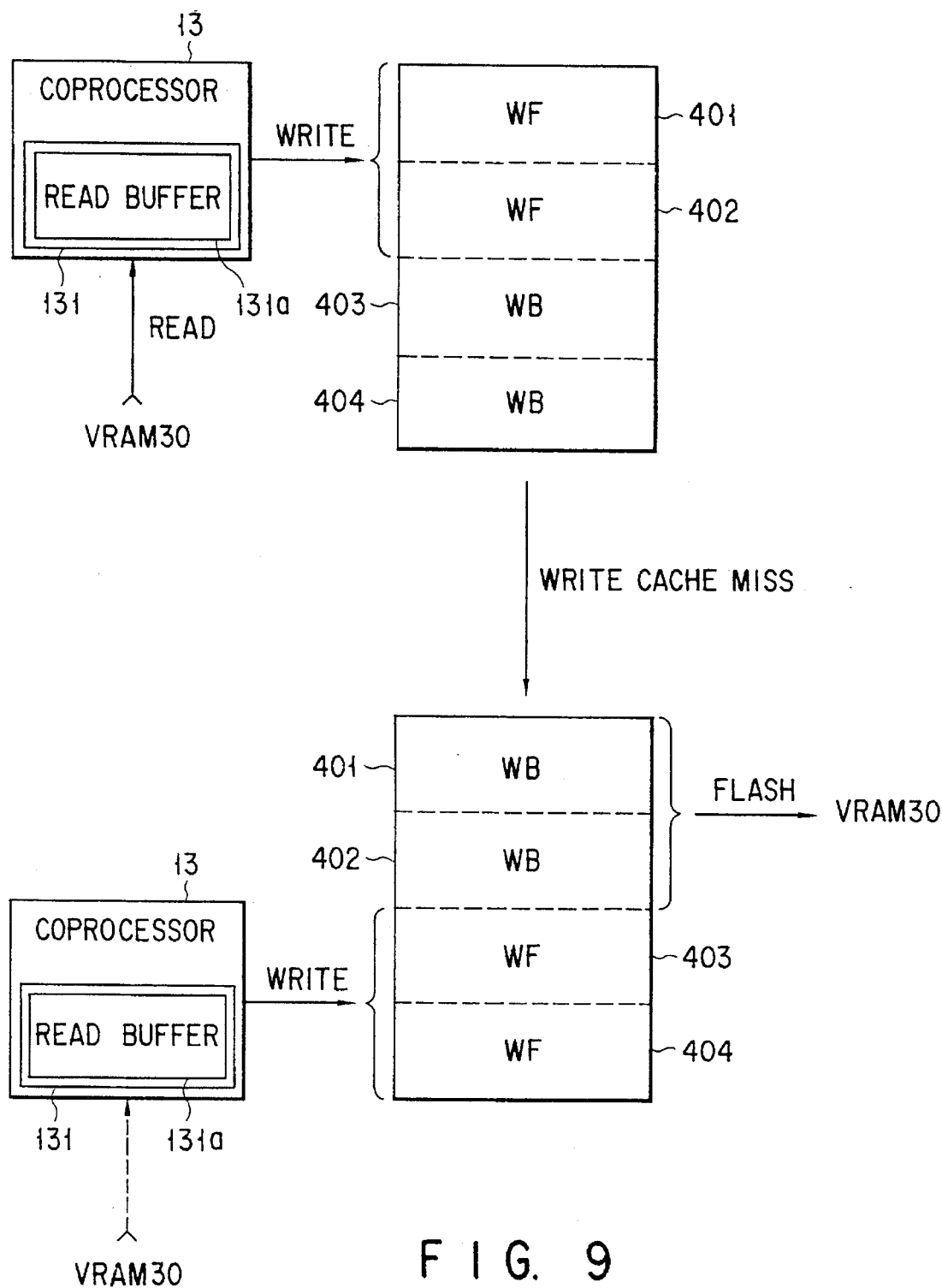
FIG. 9 is a block diagram for explaining a cache access operation in a high-speed rectangular transfer mode in the memory controller in FIG. 7.

A cache access operation in the memory controller 14 shown in FIG. 7 will be described next with reference to FIGS. 8 and 9.

Assume that the write cache memory block 401 and the read cache memory block 403 are connected to the cache interface 142, and the write cache memory block 402 and the read cache memory block 404 are connected to the frame buffer controller 143. In this case, the cache memory block 401 becomes a foreground write cache (WF); the cache memory block 402, a background write cache (WB); the cache memory block 403, a foreground read cache (RF); and the cache memory block 404, a background read cache (RB).

When the CPU 1 or the coprocessor 13 is to read out image data, a read address from the CPU 1 or the coprocessor 13 is sent to the cache memory block 403 as the foreground read cache, thus read-accessing the cache memory block 403. Concurrently, with this read access to the cache memory block 403, image data is prefetched from the dual port image memory (VRAM) 30 to the cache memory block 404 as the background read cache by the prefetch circuit 143a. The prefetched image data is an image data block succeeding the image data stored in the cache memory block 403.

In this prefetch operation, the dual port image memory (VRAM) 30 is read-accessed in the page mode. In this mode, a plurality of continuous image data arranged in the order of addresses are continuously read out at high speed.

The image data read out from the foreground read cache 403 is operated by the CPU 1 or the coprocessor 13. The operation result is sent, as write data, to the cache memory block 401 as the foreground write cache, thus write-accessing the cache memory block 401.

Such read access to the foreground read cache (RF) and write access to the background write cache (WF) are repeatedly executed. If data are written at all the entries of the cache memory block 401 (cache full) or the value of a write address exceeds an address range in which data can be written in the page mode (cache miss) in this state, switching between the foreground write cache (WF) and the background write cache (WB) is performed by the multiplexers 501 and 502. With this operation, the cache memory block 402 serves as the foreground write cache, and the cache memory block 401 serves as the background write cache.

When such a foreground/background switching operation is performed, the CPU 1 or the coprocessor 13 write-accesses the cache memory block 402, and the frame buffer controller 143 read-accesses the cache memory block 401 to perform a cache flash operation.

If a cache miss occurs in read access to the cache memory block 403, switching between the foreground read cache (RF) and the background read cache (RB) is performed by the multiplexers 503 and 504. With this operation, the cache memory block 404 serves as the foreground read cache, and the cache memory block 403 serves as the background read cache.

Since the succeeding image data has already been fetched to the cache memory block 404, the CPU 1 or the coprocessor 13 can sequentially read out the image data without a wait time when read access with continuous addresses is made.

As described above, in the arrangement of the memory controller 14 shown in FIG. 7, since the write and read caches are separately arranged, data read out from the dual port image memory 30 and stored in a cache is not destroyed by a cache write operation. In addition, drawing processing which includes both read and write operations can be efficiently executed by the CPU 1 or the coprocessor 13. Furthermore, a read/verify/write operation with respect to the dual port image memory 30 can be efficiently performed.

Note that since the cache memory blocks 401 through 404 are designed to allow read and write operations, all the four cache memory blocks 401 through 404 can be used as write caches. This realizes a cache mode (high-speed rectangular transfer mode) suitable for high-speed execution of rectangular transfer processing such as BITBLT which is supported by the coprocessor 13.

More specifically, since the coprocessor 13 has the read buffer, all the four cache memory blocks 401 through 404 can be used as write caches. Since the possibility of continuous addresses is high in BITBLT, a page mode write operation can be used by increasing the capacity of each write cache. With this operation, data can be efficiently written in the image memory 30.

A cache access operation in the high-speed rectangular transfer mode will be described next with reference to FIG. 9.

Assume that the write cache memory blocks 401 and 402 are connected to the cache interface 142, and the write cache memory blocks 403 and 404 are connected to the frame buffer controller 143. In this case, both the cache memory blocks 401 and 402 serve as foreground write caches (WFs), and both the cache memory blocks 403 and 404 serve as background write caches (WBs).

When the coprocessor 13 is to read out image data, a read address from the coprocessor 13 is sent to the frame buffer controller 143 via the direct path P1 without the mediacy of the frame buffer cache 141. The frame buffer controller 143 read-accesses the dual port image memory 30 to read out image data therefrom, and transfers the data to the coprocessor 13 via the direct path P1. The transferred image data is written in a read buffer 131a incorporated in the data operation circuit 131 of the coprocessor 13.

Subsequently, the coprocessor 13 processes the image data in the read buffer 131a, and supplies the data, as write data, to the cache memory block 401 or 402 as the foreground write cache. If there is a free space in the cache memory block 401, the cache memory block 401 is write-accessed. Otherwise, the cache memory block 402 is write-accessed.

If data are written at all the entries of the cache memory blocks 401 and 402 (cache full) or the value of a write address exceeds an address range in which data can be written in the page mode (cache miss), the foreground write caches (WFs) and the background write caches (WBs) are switched from each other by the multiplexers 501, 502, 503, and 504. With this operation, the cache memory blocks 403 and 404 serves as the foreground write caches, and the cache memory blocks 401 and 402 serves as the background write caches.

When such a foreground/background switching operation is performed, the cache memory blocks 403 and 404 are write-accessed by the coprocessor 13. Meanwhile, the frame buffer controller 143 read-accesses the cache memory blocks 401 and 402 to perform a cache flash operation.

In this cache flash operation, the dual port image memory 30 is write-accessed in the page mode.

As described above, in the arrangement shown in FIG. 7, two types of cache modes can be used: the cache mode (mixed access mode) in which write and read caches are independently arranged; and the cache mode (high-speed rectangular transfer mode) in which all the cache memory blocks are used as write caches.

Figure 10:
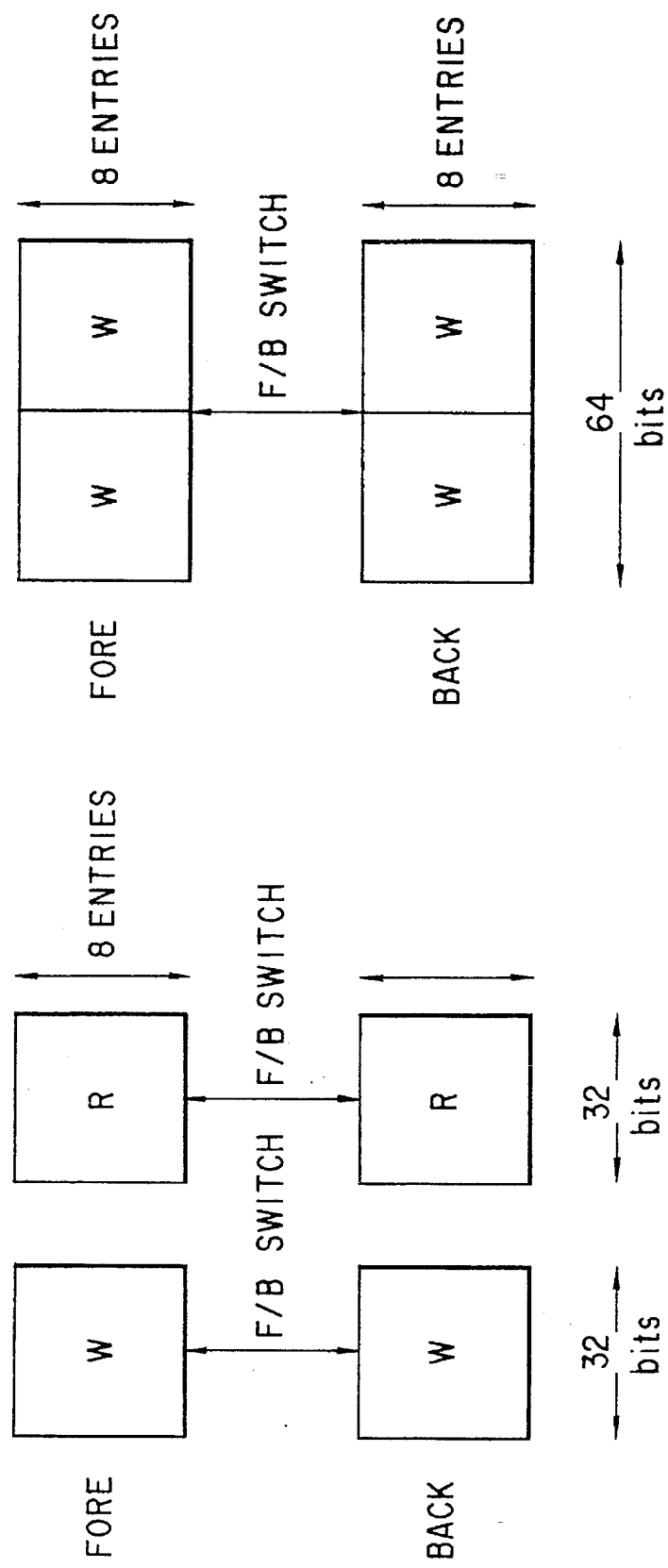
FIGS. 10A and 10B are block diagrams for explaining a foreground/background switching operation of the frame buffer cache in the memory controller in FIG. 7.

FIGS. 10A and 10B show how cache blocks are used in these two types of cache modes.

Assume that each cache memory block can store 32-bit data at each of eight entries. In this case, in the mixed access mode, the maximum data width of data which can be read/written with one cache access is 32 bits. In the high-speed rectangular transfer mode, a maximum of 64-bit data can be read/written with one cache access by simultaneously accessing two cache memory blocks.

If, therefore, the bus width between the parallel ports of the frame buffer controller 143 and the dual port image memory 30 is set to be 64 bits, the speed of a cache flash operation in the high-speed rectangular transfer mode can be further increased.

Figure 11:
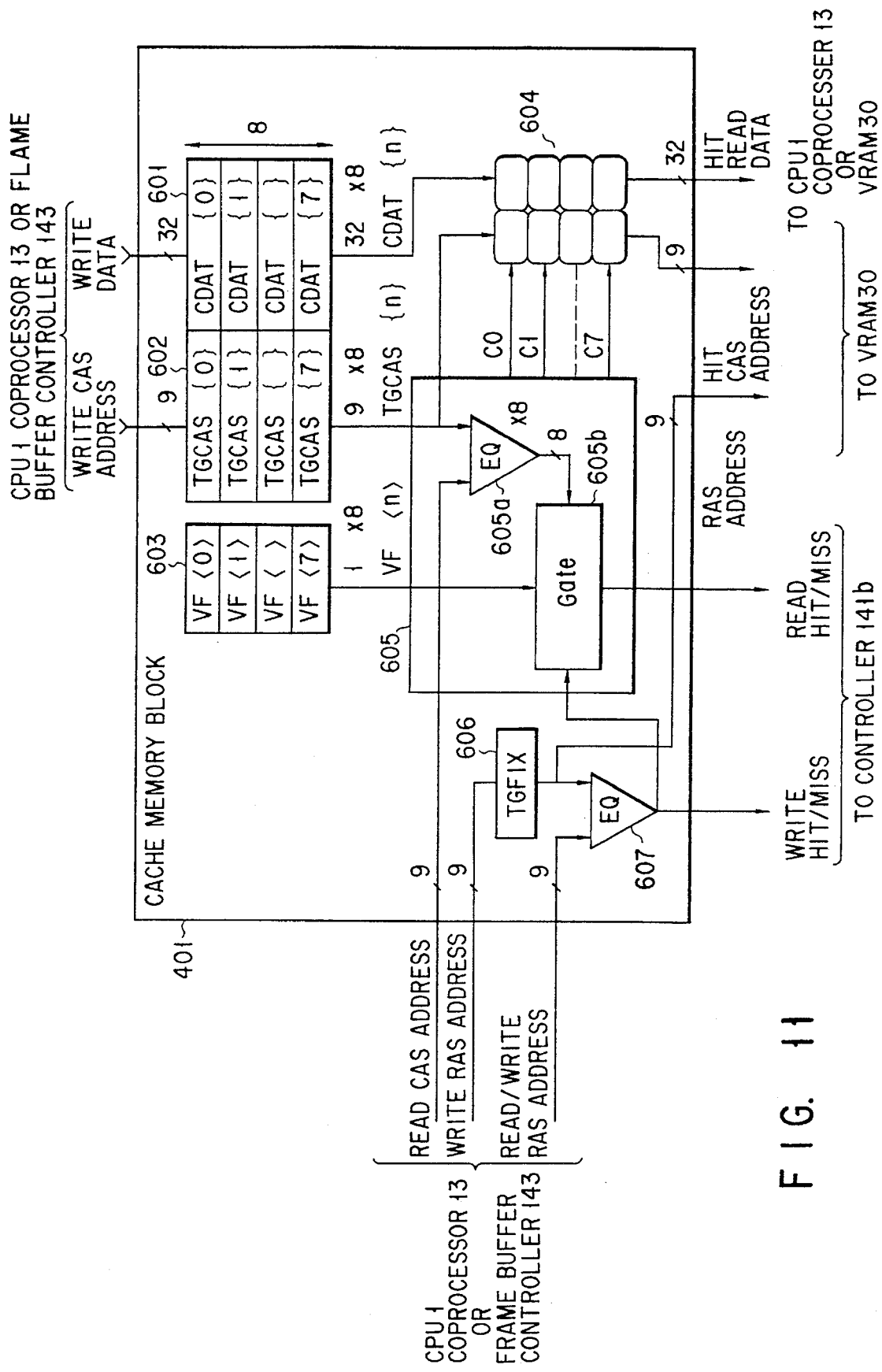
FIG. 11 is a circuit diagram showing the detailed arrangement of the frame buffer cache arranged in each of the memory controllers shown in FIGS. 2, 3, and 7.

FIG. 11 shows the arrangement of each cache memory block arranged in the frame buffer cache 141.

Since the cache memory blocks arranged in the frame buffer cache 141 have the same arrangement, the cache memory block 401 shown in FIG. 7 will be described below as a representative block.

The cache memory block 401 has a circuit arrangement suitable for page mode access to the dual port image memory 30. More specifically, as shown in FIG. 11, the cache memory block 401 comprises a data memory 601, a tag memory 602, a valid flag register 603, a multiplexer 604, a multiplexer controller 605, a fixed tag register 606, and a fixed tag comparator 607.

The data memory 601 serves to hold image data (C DAT) supplied, as write data, to the cache memory block 401, and has eight entries each having a width of 32 bits. The tag memory 602 serves to hold tag information indicating a specific address of the dual port image memory 30 to which image data in the data memory 601 corresponds. Similar to the data memory 601, the tag memory 602 has eight tag entries. At each tag entry, the tag information of image data held at a corresponding entry of the data memory 601 is stored. As tag information, a 9-bit CAS address (column address) of the dual port image memory 30 is used. This CAS address is part of a write address output from the CPU 1, the coprocessor 13, or the frame buffer controller 143 when the cache memory block 401 is to be read-accessed. The valid flag register 603 holds a valid flag (VF) indicating whether data at each entry of the data memory 601 is valid. The multiplexer 604 selects tag information and data, to which a hit is determined, from the respective entries of the data memory 601 and the tag memory 602. Since tag information is a CAS address, when a cache flash operation is to be performed, the dual port image memory 30 can be accessed in the page mode by using the read tag information.

The multiplexer controller 605 serves to control the select operation of the multiplexer 604, and includes eight tag comparators 605a and a gate circuit 605b. The eight tag comparators 605a serve to detect a specific entry of the data memory 601 at which data designated by a read CAS address is present. The tag comparators 605a respectively compare pieces of tag information from the eight entries of the tag memory 602 with the read CAS address and output an 8-bit comparison result signal. The read CAS address is part of a read address output from the CPU 1, the coprocessor 13, or the frame buffer controller 143 when the cache memory block 401 is read-accessed.

The gate circuit 605b detects a cache hit/cache miss in a read access operation on the basis of an 8-bit comparison result signal from the tag comparators 605a, valid flags (VF0 through VF7), and a comparison result signal from the fixed tag comparator 607. More specifically, the gate circuit 605b checks whether the entry of the data memory 601 at which the data designated by the read CAS address is present is valid. If it is determined that the entry is invalid, a cache miss is determined, and a mishit signal is output. In contrast to this, if it is determined that the entry is valid, a cache hit/cache miss is determined on the basis of the comparison result signal from the fixed tag comparator 607. When the comparison result signal from the fixed tag comparator 607 indicates coincidence, the gate circuit 605b outputs a read HIT signal indicating that a cache hit is made in the read access. At this time, of selection signals C0 through C7, a selection signal corresponding to the entry designated by the read CAS address is enabled, and the multiplexer 604 is controlled such that the tag information and the data at the entry designated by the read CAS address are read out.

In the fixed tag register 606, a write RAS address output from the CPU 1, the coprocessor 13, or the frame buffer controller 143 in the first write access operation is set. The fixed tag comparator 607 compares the write RAS address in the fixed tag register 606 with an RAS address output from the CPU 1, the coprocessor 13, or the frame buffer controller 143 in a write or read access operation. In a write access operation, a cache hit/cache miss is determined only by checking whether the write RAS address in the fixed tag register 606 coincides with an RAS address included in a write address. In a read access operation, a signal indicating whether the write RAS address in the fixed tag register 606 coincides with an RAS address included in a read address is supplied to the gate circuit 605b.

In addition, the write RAS address set in the fixed tag register 606 is used to write-access the dual port image memory 30 in the page mode in a cache flash operation.

As described above, by using a write RAS address as a fixed tag, only data having the same RAS address can be written in the cache memory block 401. In addition, since a CAS address is stored, as tag information, at each tag entry, the tag information can be effectively used for page mode access to the dual port image memory 30.

As described above, in this display control system, with the use of the frame buffer cache 141, an image data read/write operation of the CPU 1 or the coprocessor 13 and an access operation of the dual port image memory 30 can be simultaneously executed.

In an image data read operation performed by the CPU 1 or the coprocessor 13, the cache hit rate can be increased by prefetching image data to the frame buffer cache 141. When a cache miss occurs, the CPU 1 or the coprocessor 13 is kept in a wait state until image data is read out from the dual port image memory 30. However, when a cache hit is made, desired image data can be quickly read out from the frame buffer cache 141. Therefore, prefetching of image data to the frame buffer cache 141 can shorten the wait time of the CPU 1 or the coprocessor 13.

The above description is based on the assumption that the CPU 1 or the coprocessor 13 accesses continuous data in the order of the addresses. In practice, however, random access like general memory access is relatively frequently made as well as access with continuous addresses.

If random access is made frequently, prefetching of image data to the frame buffer cache 141 and page mode access to the dual port image memory 30 only increase the number of unnecessary data read operations with respect to the dual port image memory 30, resulting in a deterioration in the drawing performance of the CPU 1 or the coprocessor 13. It is, therefore, preferable that prefetch processing and page mode access be performed only in an access operation with continuous addresses.

FIG. 12 shows the arrangement of the memory controller 14 designed to perform prefetch processing and page mode access only in an access operation with continuous addresses.

This memory controller 14 includes an access mode determination circuit 144 in addition to the arrangement of the memory controller shown in FIGS. 2, 3, and 7.

The access mode determination circuit 144 predicts/determines an access mode in accordance with the history of changes in read address from the CPU 1 or the coprocessor 13, and controls a prefetch operation and a page mode access operation, performed by the frame buffer controller 143, on the basis of the determination result. The access mode prediction/determination processing of the access mode determination circuit 144 is started in response to a read/write (R/W) signal indicating read access and supplied from the cache interface 142. At this time, addresses supplied from the CPU 1 or the coprocessor 13 are sequentially loaded in the access mode determination circuit 144.

A determination result obtained by the access mode determination circuit 144 is supplied to the frame buffer controller 143. If the access mode determination circuit 144 determine that access made by the CPU 1 or the coprocessor 13 is continuous access, the execution of prefetch processing or page mode access by the frame buffer controller 143 is permitted. If random access is determined, the execution of prefetch processing or page mode access by the frame buffer controller 143 is inhibited.

Figure 13:
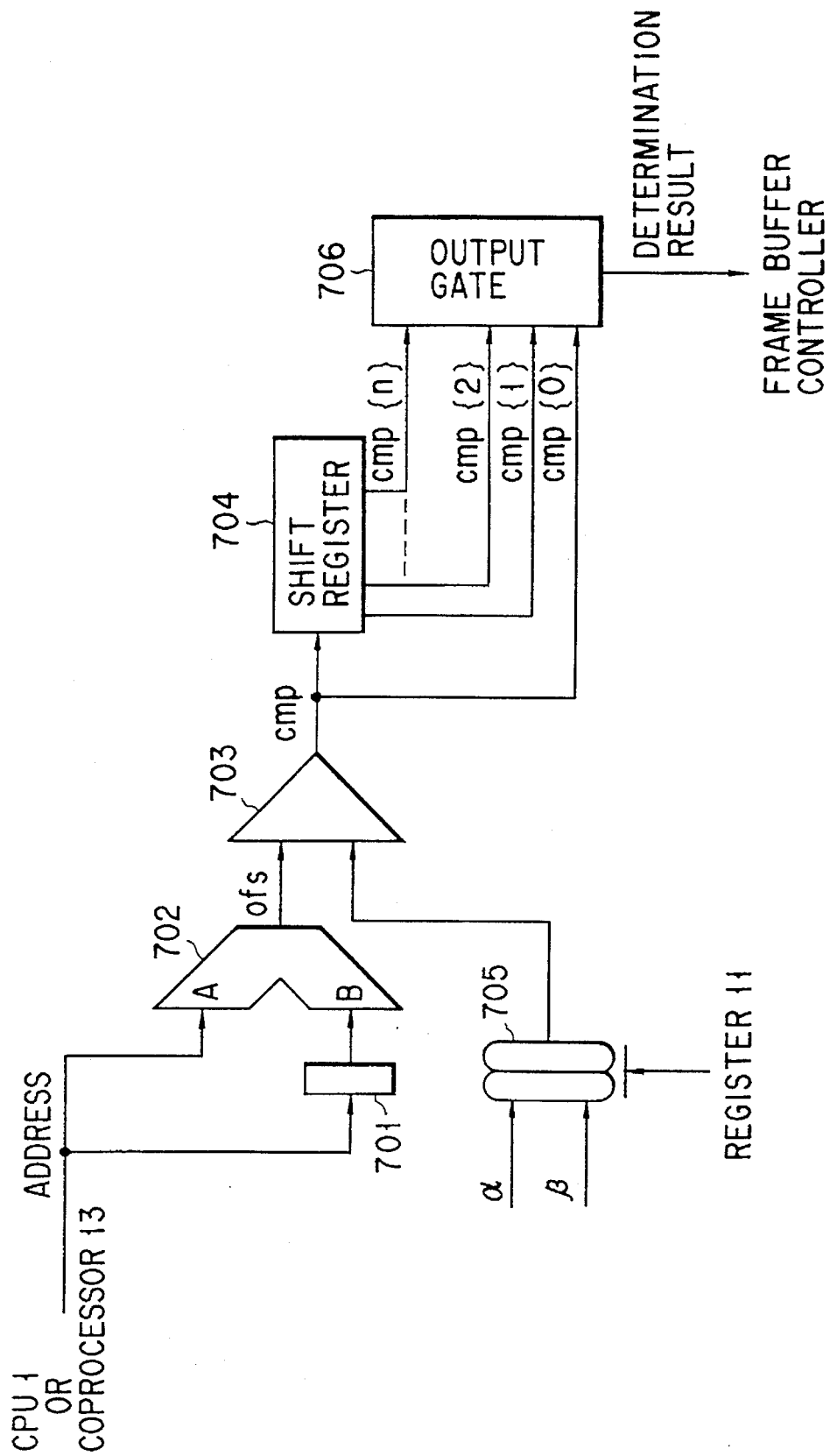
FIG. 13 is a circuit diagram showing the detailed arrangement of an access mode determination circuit arranged in the memory controller in FIG. 12.

FIG. 13 shows the detailed circuit arrangement of the access mode determination circuit 144.

As shown in FIG. 13, the access mode determination circuit 144 is constituted by a register 701, a subtracter 702, a comparator 703, a shift register 704, a selector 705, and an output gate 706.

A read address from the CPU 1 or the coprocessor 13 is directly input to a first input terminal A of the subtracter 702 and is also input to a second input terminal B of the subtracter 702 via the register 701. The register 701 holds the read address by an amount corresponding to one cycle. Therefore, a read address input to the first input terminal A of the subtracter 702 is a current read address, and a read address input to the second input terminal B is a read address one cycle ahead of the current address.

The subtracter 702 subtracts the value of the previous read address input to the second input terminal B from the value of the current read address input to the first input terminal A. This subtraction result (offset ofs) is supplied to one input terminal of the comparator 703. A constant ($\alpha$ or $\beta$) selected by the selector 705 is supplied to the other input terminal of the comparator 703.

The comparator 703 compares the constant with the offset ofs and outputs a comparison result signal cmp indicating their relationship in magnitude. This comparison result cmp is supplied to the shift register 704 and the output gate 706. The shift register 704 sequentially shifts the comparison result signals cmp output from the comparator 703 to hold comparison results corresponding to $n$ comparison cycles.

The output gate 706 generates a determination result signal in accordance with the comparison results held in the shift register 704 and the current comparison result output from the comparator 703.

In the access mode determination circuit 144 having the above-described arrangement, states of change in read address are determined in accordance with the comparison result signals cmp. In this case, the states of change in read address which are represented by the comparison result signals cmp are classified into three states rnd, inc, and dec.

The state rnd indicates that the difference between continuous read address values is large. The state rnd is established by the following conditions:

$\alpha < ofs$ ... cmp=rnd $ofs < -\alpha$ ... cmp=rnd

The state inc indicates that the read address value continuously changes in a direction to increment the address. The state inc is established by the following condition:

$0 \leq ofs \leq \alpha$ ... cmp=inc

The state dec indicates that the read address value continuously changes in a direction to decrement the address. The state dec is established by the following condition:

$-\alpha \leq ofs < 0$ ... cmp=dec

Access mode determination processing is performed by using the comparison result signals cmp representing these three states rnd, inc, and dec in the following manner.

Upon receiving the comparison result signals cmp representing that the state inc is set twice consecutively, the output gate 706 determines continuous addresses in the direction to increment the address, and causes the frame buffer controller 143 to execute prefetch processing. In this case, prefetched data is data located at an address which is continuous in the direction to increment the address with respect to the data requested by the read address. Upon receiving the comparison result signals cmp representing that the state dec is set twice consecutively, the output gate 706 determines continuous addresses in the direction to decrement the address, and causes the frame buffer controller 143 to execute prefetch processing. In this case, prefetched data is data located at an address which is continuous in the direction to decrement the address with respect to the data requested by the read address. Upon receiving the comparison result signals representing that the state inc or dec is set $n$ times or more consecutively, the output gate 706 determines that a plurality of data can be prefetched at once, and causes the frame buffer controller 143 to switch from the prefetch mode to the page mode.

Upon receiving the comparison result signals cmp representing that the state rnd is set twice consecutively, the output gate 706 determines random access, and inhibits the frame buffer controller 143 from executing prefetch processing.

As described above, the access mode determination circuit 144 determines, in accordance with the history of the comparison result signals cmp, whether the access mode of the CPU 1 or the coprocessor 13 is the random access mode, the continuous access mode in the direction to decrement the address, or the continuous access mode in the direction to increment the address.

Figures 14, 15:
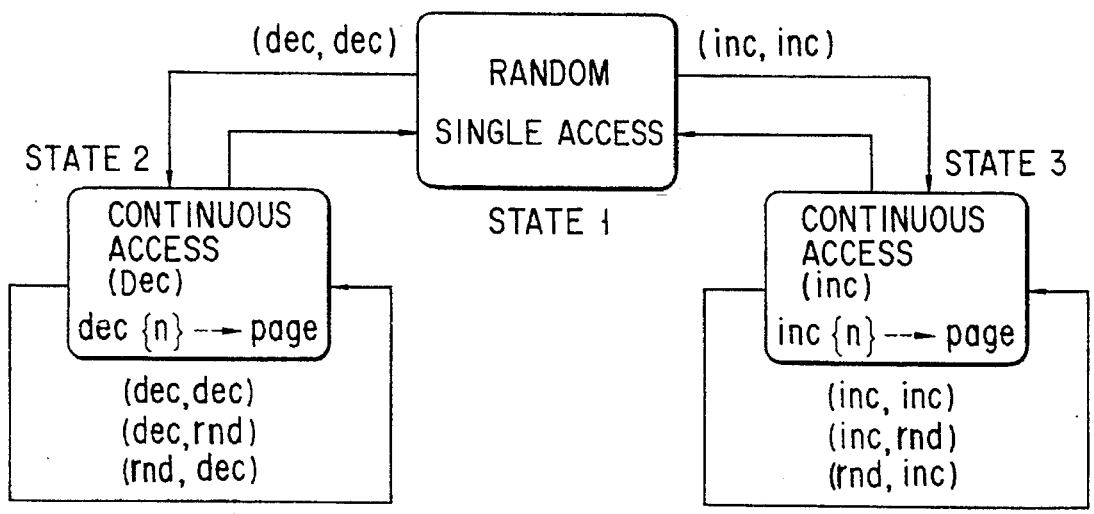
FIG. 14 is a block diagram for explaining a mode determination operation of the access mode determination circuit in FIG. 13.
FIG. 15 is a table showing the relationship between prefetch processing and the mode determination results obtained by the access mode determination circuit in FIG. 13.

FIG. 14 shows the state transition of these determination results.

Referring to FIG. 14, state 1 is a state wherein it is determined that the read access mode of the CPU 1 or the coprocessor 13 is the random access mode. Mode determination processing is started from this state. In state 1, when the comparison result signals cmp represent that the state dec is set twice consecutively, transition from state 1 to state 2 occurs.

State 2 is a state wherein it is determined that the read access mode of the CPU 1 or the coprocessor 13 is the continuous access mode in the direction to decrement the address. In state 2, when the two latest comparison result signals (cmp {0}, {1}) represent (dec, dec), (dec, rnd), and (rnd, dec), state 2 is maintained. Otherwise, transition to state 1 representing the random access mode occurs. As described above, even if the state rnd occurs once, the random access mode is not determined in consideration of the fact that in continuous access to a 2-D rectangular area, the difference between address values temporarily becomes large across a line. In addition, in state 2, when the comparison result signals cmp represent that the state dec is set $n$ times consecutively, the VRAM access mode is switched to the page mode.

In state 1, when the comparison result signals cmp represent that the state inc is set twice consecutively, transition from state 1 to state 3 occurs.

State 3 is a state wherein it is determined that the read access mode of the CPU 1 or the coprocessor 13 is the continuous access mode in the direction to increment the address. In state 3, when the two latest comparison result signals (cmp {0}, {1}) represent (inc, inc), (inc, rnd), and (rnd, inc), state 3 is maintained. Otherwise, transition to state 1 representing the random access mode occurs. As described above, even if the state rnd occurs once, the random access mode is not determined in consideration of access to a 2-D rectangular area. Furthermore, in state 3, when the comparison result signals cmp represent that the state inc is set $\underline{n}$ times consecutively, the VRAM access mode is switched to the page mode.

FIG. 15 shows the relationship between prefetch processing and the respective access mode states (state 1 through state 3) determined by the access mode determination circuit 144.

In state 1, since the access mode of the CPU 1 or the coprocessor 13 is the random access mode, prefetch processing is not executed. In addition, the access mode (VRAM access mode) for the dual port image memory 30 is set to the single mode in which the dual port image memory 30 is accessed once for each read address supplied from the CPU 1 or the coprocessor 13. In this case, if a cache miss occurs, data designated by the corresponding read address is read out from the dual port image memory 30.

In state 2, since the access mode of the CPU 1 or the coprocessor 13 is the continuous access mode based on the execution of a string move instruction and the like, prefetch processing is executed. In this case, the VRAM access mode is set to the signal mode first, and next data is prefetched in consideration of a decrease in read address value when the comparison result signals representing the state dec are generated $\underline{n}$ times consecutively in this state, the single mode is switched to the page mode to prefetch a plurality of data which are continuous with each other in the order of the addresses.

In state 3, the access mode of the CPU 1 or the coprocessor 13 is also the continuous access mode based on the execution of a string move instruction and the like, prefetch processing is executed. In this case, the VRAM access mode is set to the signal mode first, and the next data is prefetched in consideration of an increase in read address value when the comparison result signals cmp representing the state inc are generated $\underline{n}$ times consecutively in this state, the signal mode is switched to the page mode to prefetch a plurality of data which are continuous with each other in the order of the addresses.

As described above, in the memory controller shown in FIG. 12, the access mode of the CPU 1 or the coprocessor 13 is predicted/determined by the access mode determination circuit 144, and prefetch processing and the VRAM access mode can be controlled on the basis of the determination result. Therefore, prefetch processing and page mode access can be used only in a continuous access operation, thereby improving the efficiency in reading data from the dual port image memory 30.

In this case, the access mode determination circuit 144 is arranged in the memory controller 14 in FIG. 2. Similarly, the access mode determination circuit 144 can be arranged in each of the memory controllers 14 shown in FIGS. 3 and 7. In addition, an access mode in a write access operation can also be determined in the same manner as described above. In this case, a determination result is used to switch the VRAM access mode in a cache flash operation. That is, when write access is random access, a cache flash operation is executed by VRAM access in the signal mode when write access is continuous access, a cache flash operation is executed by VRAM access in the page mode.

Figure 16:
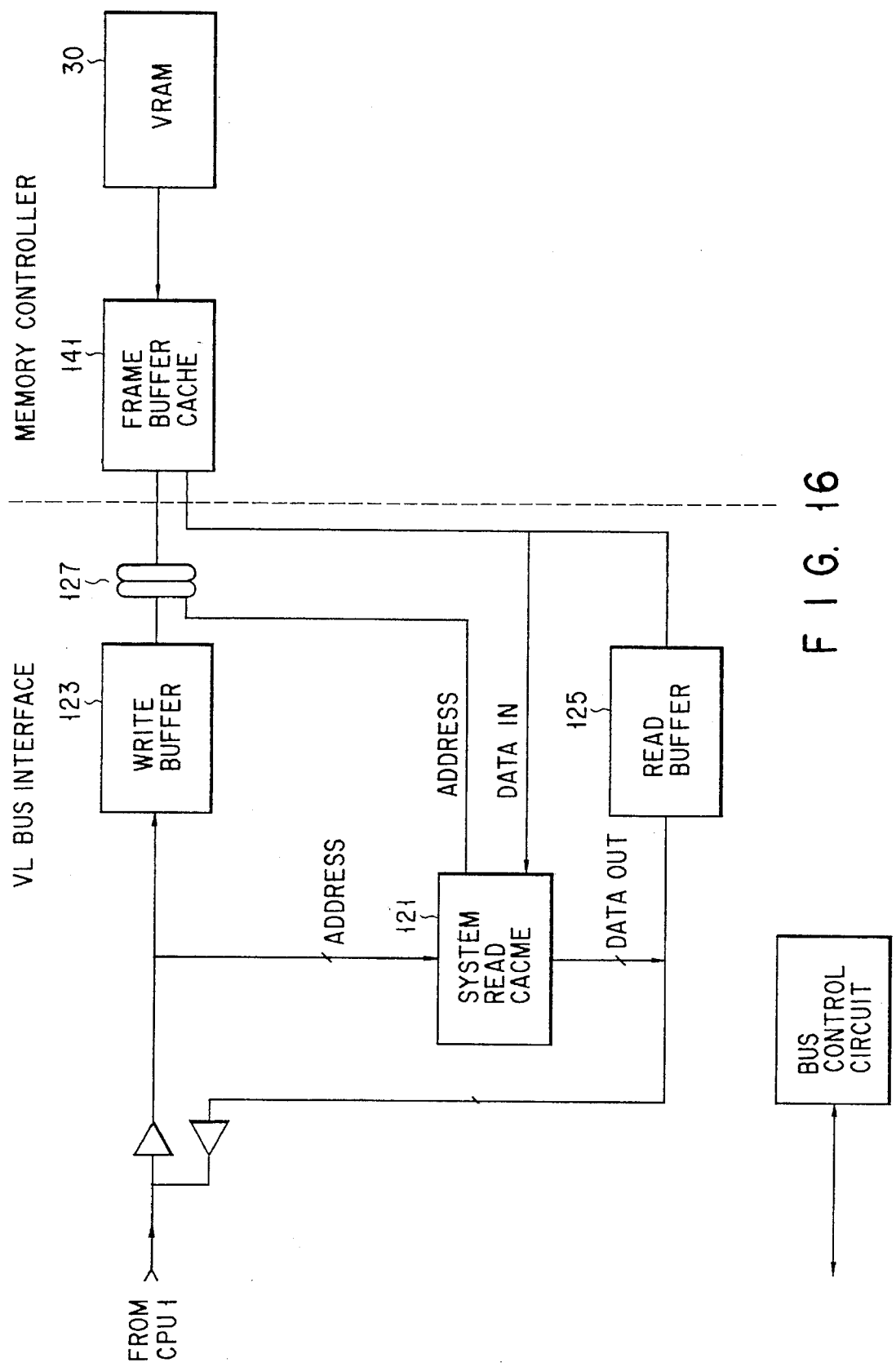
FIG. 16 is a block diagram showing a display control system according to another embodiment of the present invention, in which a system read cache is arranged in a VL-BUS interface.

FIG. 16 is a block diagram showing another embodiment of the present invention. In this embodiment, in addition to a frame buffer cache 141 arranged in a memory controller 14, a system read cache is arranged in a VL bus interface 12 so that a CPU 1 can read VRAM data at a higher speed. Note that access to a system read cache of a bus master is invalid.

Referring to FIG. 16, a system read cache 121 is a dedicated cache designed to allow the CPU 1 to read VRAM data. The system read cache 121 holds part of the stored contents of the frame buffer cache 141.

In the initial state, the system read cache 121 is empty. Therefore, an address is supplied from the system read cache 121 to the frame buffer cache 141 via a multiplexer 127. In the initial state, since the frame buffer cache 141 is empty, the CPU 1 reads out data from a VRAM 30 in units of pages. In this embodiment, four double word image data are read out from the VRAM 30 and stored in the frame buffer cache 141. At this time, data corresponding to a VRAM address accessed by the CPU 1 is fetched by the CPU 1 via a read buffer 125. If the CPU 1 subsequently accesses an address adjacent to the previous address, a mishit occurs in the system read cache 121, but a hit is gained in the frame buffer cache 141. In response to a hit signal from the frame buffer cache 141, the system read cache 121 starts a system cache data read cycle. In this cycle, data (one double word) corresponding to the address output from the CPU 1 is fetched by the CPU 1 via the read buffer 125, and is also fetched by the system read cache via a line (DATAIN). In addition, the system read cache sequentially supplies the remaining adjacent addresses corresponding to three double word data to the frame buffer cache 141 to fetch the remaining three double word image data held in the frame buffer cache 141 via a data bus (DATAIN). Furthermore, if the CPU 1 accesses a VRAM address adjacent to the previous address, a hit is gain in the system read cache. As a result, the CPU 1 reads out desired image data from the system read cache 121 via a bus (DATAOUT). A write buffer 123 and a read buffer 125 are arranged to establish synchronization between the VL-BUS interface 12 side (system clock) and the memory controller 14 side (memory clock).

Note that when a coprocessor 13 read-accesses a system memory 2, the read data is stored in the internal buffer of the coprocessor 13 via the write buffer 123 and the multiplexer 127. When the coprocessor 13 is to write data in the system memory 2, the write data is written in the system memory 2 via the read buffer 125. Note that since the coprocessor 13 has a buffer having a capacity larger than that of the system read cache 121, the coprocessor 13 does not access the system read cache 121.

Figure 17:
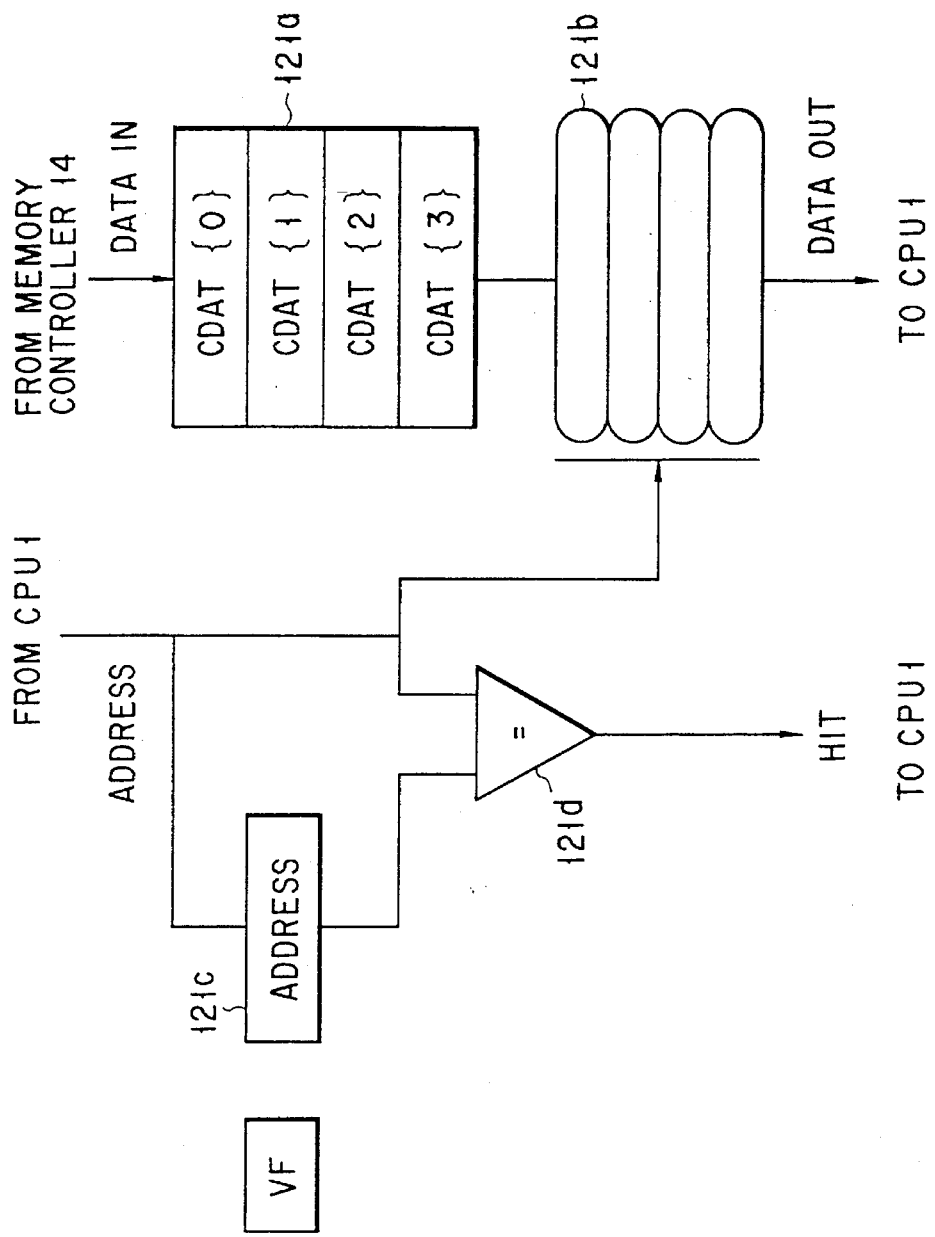
FIG. 17 is a block diagram showing the detailed arrangement of a system read cache in FIG. 6.

FIG. 17 is a block diagram showing the detailed arrangement of the system read cache 121 in FIG. 16. Referring to FIG. 17, if a mishit occurs in a system cache memory block 121a, and a hit (VRAM read cache hit) is gained in the frame buffer cache 141, four double word VRAM data are loaded into the system cache memory block 121a in the page mode. At this time, the addresses used to read the data are stored in a register 121c. In this embodiment, since VRAM data located at adjacent addresses are read into the system read cache memory block 121a in units of four double word data, addresses of two lower bits can be neglected when the CPU 1 subsequently accesses the VRAM 30, the corresponding address is compared with the address stored in the register 121c by a comparator 121d. If a hit is gained, the corresponding data is output from a multiplexer 121b and supplied to the CPU 1. If a mishit occurs, the data is supplied to the multiplexer 127, and the address from the system read cache 121 is supplied to the frame buffer cache 141. As a result, the corresponding image data from the frame buffer cache 141 is fetched by the system read cache 121.

In this arrangement, when a hit is gained in the system read cache 121, only three system clocks (CKS) are required, thus further increasing the access speed as compared with the case wherein a hit is gained in the frame buffer cache 141 (seven system clocks). Therefore, the problem associated with an access operation of the image memory and synchronization, which has been described in "Description of the Related Art", can be solved.

In the embodiment shown in FIG. 16, the cache memory included in the VL bus interface is designed as a read-only system read cache. However, this memory may be designed as a system cache memory from/in which data can be read/written by a host processor.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A display control system comprising:

an image memory for storing image data generated by a CPU of a host computer including said display control system and a drawing processor arranged in said display control system;

display means for displaying the image data, stored in said image memory, on a display;

a cache memory, including first and second cache memory blocks from/in which data can be independently read/written, for storing part of the image data stored in said image memory, said cache memory being designed such that the image data is read/written therefrom/therein in accordance with a read/write request from said CPU of said host computer or said drawing processor;

memory control means;

cache switching means for alternately switching and connecting said first and second cache memory blocks to the processor and said memory control means so as to allow the processor and said memory control means to simultaneously execute cache access; and hit detection means for detecting a cache hit/cache miss depending on whether data, read access of which is requested by said CPU of the host computer or said drawing processor, is stored in said cache memory;

said memory control means being connected to said cache memory, said image memory, and said hit detection means for replacing contents of said cache memory by transferring image data stored in said image memory to said cache memory in response to a cache miss detected by said hit detection means.

2. A system according to claim 1, wherein said memory control means comprises prefetch means for reading out image data, succeeding image data stored in one of said first and second cache memory blocks which is connected to the processor, from said image memory, and prefetching the readout image data to the other of said first and second cache memory blocks.

3. A system according to claim 2, wherein said prefetch means read-accesses said image memory in the page mode and continuously transfers a plurality of continuous image data from said image memory to said cache memory in an order of addresses.

4. A system according to claim 2, further comprising hit detection means for detecting a cache hit/cache miss depending on whether data, read access of which is requested by the processor, is stored in said cache memory block connected to the processor, and wherein in response to said cache miss detected by said hit detection means, said cache switching means switches said cache memory block connected to the processor to said cache memory block, to which the image data is prefetched by said prefetch means.

5. A system according to claim 1, further comprising hit detection means for detecting a cache hit/cache miss depending on whether data, write access of which is requested by the processor, is data on a predetermined row line of said image memory, and wherein in response to a cache miss detected by said hit detection means, said cache switching means switches said cache memory block to which the process is connected, from one of said first and second cache memory blocks to the other.

6. A system according to claim 5, wherein said memory control means writes image data, stored in said cache memory block newly connected to said memory control means, in said image memory in response to connection switching of a write cache memory block by said cache switching means.

7. A display control system comprising:

an image memory for storing image data generated by a CPU of a host computer including said display control system and a drawing processor arranged in said display control system;

display means for displaying the image data, stored in said image memory, on a display;

a cache memory for storing part of the image data stored in said image memory, said cache memory being designed such that the image data is read/written therefrom/therein in accordance with a read/write request from said CPU of said host computer or said drawing processor, said cache memory including first and second write cache memory blocks for respectively storing image data to be written in said image memory and allowing data write/read operations independently, and first and second read cache memory blocks for respectively storing image data read out from said image memory and allowing write/read operations independently;

memory control means;

write cache switching means for alternately switching and connecting said first and second write cache memory blocks to the processor and said memory control means to simultaneously execute write access and read access to said write cache memory block;

read cache switching means for alternately switching and connecting said first and second read cache memory blocks to the processor and said memory control means so as to allow the processor and said memory control means to simultaneously execute read access and write access to said read cache memory block; and hit detection means for detecting a cache hit/cache miss depending on whether data, read access of which is requested by said CPU of the host computer or said drawing processor, is stored in said cache memory; and said memory control means, being connected to said cache memory, said image memory, and said hit detection means for replacing contents of said cache memory by transferring image data stored in said image memory to said cache memory in response to a cache miss detected by said hit detection means.

8. A system according to claim 7, wherein said memory control means comprises prefetch means for reading out image data, succeeding image data stored in one of said first and second read cache memory blocks which is read-accessed by the processor, from said image memory, and prefetching the image data to the other of said first and second read cache memory blocks.

9. A system according to claim 8, wherein said prefetch means read-accesses said image memory in the page mode and continuously transfers a plurality of continuous image data from said image memory to the other of said first and second read cache memory blocks in the order of addresses.

10. A system according to claim 8, further comprising hit detection means for detecting a cache hit/cache miss depending on whether data, read access of which is requested by the processor, is stored in said cache memory block connected to the processor, and wherein in response to said read cache miss detected by said hit detection means, said read cache switching means switches said read cache memory block connected to the processor to said read cache memory block, to which the image data is prefetched by said prefetch means.

11. A system according to claim 7, further comprising hit detection means for detecting a cache hit/cache miss depending on whether data write-requested by the processor is data on the same display line as that of data stored in said write cache memory block connected to the processor, and wherein in response to a cache miss detected by said hit detection means, said write cache switching means switches said write cache memory block to which the processor is connected to the other write cache memory block.

12. A system according to claim 11, wherein said memory control means writes image data, stored in said write cache memory block newly connected to said memory control means, in said image memory in response to connection switching of a write cache memory block by said write cache switching means.

13. A display control system comprising:

an image memory for storing image data generated by a CPU of a host computer including said display control system and a drawing processor arranged in said display control system;

display means for displaying the image data, stored in said image memory, on a display;

a cache memory for storing part of the image data stored in said image memory, said cache memory being designed such that the image data is read/written therefrom/therein in accordance with a read/write request from said CPU of said host computer or said drawing processor, said cache memory being constituted by first to fourth cache memory blocks, each allowing the processor to read/write data therefrom/therein and having a maximum data width of $n$ ($n$ is a positive integer not less than eight) bits;

hit detection means for detecting a cache hit/cache miss depending on whether data, read access of which is requested by said CPU of the host computer or said drawing processor, is stored in said cache memory; and memory control means, connected to said cache memory, said image memory, and said hit detection means for replacing contents of said cache memory by transferring image data stored in said image memory to said cache memory in response to a cache miss detected by said hit detection means, said memory control means reading out image data stored in said third and fourth cache memory blocks in units of 2 n bits and writes the image data in said image memory while the processor writes image data, which are to be written in said image memory, in said first and second cache memory blocks in units of 2 n bits.

14. A display control system comprising:

an image memory for storing image data generated by a processor;

display means for displaying the image data, stored in said image memory, on a display;

a cache memory for storing the image data read out from said image memory, said cache memory being designed such that the image data is read/written therefrom/therein in accordance with a read/write request from the processor;

access mode determination means, including a latch storing previous address data and a comparator for comparing the previous address data with new address supplied from the processor, for determining, in accordance with a history of changes in read address supplied from the processor, whether read access is performed by the processor in a continuous access mode in which continuous data are sequentially read out in an increasing or decreasing order of addresses; and prefetch means for reading out image data succeeding image data read-requested by the processor from said image memory and prefetching the image data to said cache memory when said access mode determination means determines the continuous access mode.

15. A system according to claim 14, wherein said access mode determination means further includes a history circuit which stores the comparison results from the comparator, and determines whether read access is performed by the processor in a continuous access mode based on the comparison results stored in the history circuit.

16. A display control system connected through a local bus to a CPU of a host computer, comprising:

a multi-ported image memory for storing image data generated by the CPU and transferred to the image memory through said local bus;

a drawing processor arranged in said display control system for accelerating drawing functions;

display means for displaying the image data, stored in said image memory, on a display;

memory control means including a cache memory for storing part of the image data stored in said image memory, said cache memory being designed such that the image data is read/written therefrom/therein in accordance with a read/write request from said CPU of said host computer or said drawing processor, the cache memory storing data by comparing a write row address to a fixed tag and storing the data corresponding to the row address if the comparison produces a match, storing column addresses as tag data in tag entries for use in page mode access of the multi-ported image memory; and hit detection means for detecting a cache hit/cache miss depending on whether data, read access of which is requested by said CPU of the host computer or said drawing processor, is stored in said cache memory; and said memory control means being connected to said cache memory, said image memory, and said hit detection means for replacing contents of said cache memory, by transferring image data stored in said image memory to said cache memory in response to a cache miss detected by said hit detection means.

* * * * *

UNITED STATES PATENT AND TRADEMARK OFFICE
CERTIFICATE OF CORRECTION

PATENT NO. : 5,559,952
DATED : September 24, 1996
INVENTOR(S) : Akihisa FUJIMOTO It is certified that error appears in the above-indentified patent and that said Letters Patent is hereby corrected as shown below:

Claim 13, column 24, line 8, "2 n" should read --2n--.

Claim 13, column 24, line 12, "2 n" should read --2n--.

Signed and Sealed this

Twenty-fifth Day of February, 1997

Attest:

BRUCE LEHMAN

*Attesting Officer*   *Commissioner of Patents and Trademarks*